(12) United States Patent
Allaei

(10) Patent No.: US 9,291,148 B2
(45) Date of Patent: Mar. 22, 2016

(54) INTAKE ASSEMBLIES FOR WIND-ENERGY CONVERSION SYSTEMS AND METHODS

(75) Inventor: Daryoush Allaei, Minnetonka, MN (US)

(73) Assignee: SHEER WIND, INC., Chaska, MN (US)

( * ) Notice: Subject to any disclaimer, the term of this patent is extended or adjusted under 35 U.S.C. 154(b) by 833 days.

(21) Appl. No.: 13/307,313

(22) Filed: Nov. 30, 2011

(65) Prior Publication Data

US 2013/0136574 A1    May 30, 2013

(51) Int. Cl.
*F03D 1/04*    (2006.01)

(52) U.S. Cl.
CPC .............. *F03D 1/04* (2013.01); *F05B 2240/131* (2013.01); *F05B 2250/5011* (2013.01); *Y02E 10/72* (2013.01)

(58) Field of Classification Search
CPC .......... F03D 1/04; F03D 1/0427; F03D 3/04; F03D 3/0427; F05B 2240/131; F05B 2250/5011
USPC ............ 290/44, 55; 415/2.1, 4.1, 26, 47, 126, 415/127, 146, 147, 148, 151, 167, 202, 909, 415/4.4, 907; 416/DIG. 8
See application file for complete search history.

(56) References Cited

U.S. PATENT DOCUMENTS

| 25,269 A | 8/1859 | Livingston |
|---|---|---|
| 84,237 A | 11/1868 | Waite |
| 299,127 A | 5/1884 | Garrigus |
| 330,265 A | 11/1885 | Scovill |
| 757,800 A | 4/1904 | Williams |
| 1,345,022 A | 6/1920 | Oliver |
| 1,496,767 A | 6/1924 | Bonetto |
| 1,599,944 A * | 9/1926 | Baumgart ................ 415/46 |
| 2,616,506 A | 11/1952 | Mathias |
| 3,894,393 A | 7/1975 | Carlson |
| 3,944,840 A | 3/1976 | Troll |
| 4,079,264 A | 3/1978 | Cohen |
| 4,406,579 A * | 9/1983 | Gilson ................ 415/2.1 |
| 4,421,452 A | 12/1983 | Rougemont |
| 4,452,046 A * | 6/1984 | Valentin ................ 60/641.11 |
| 4,508,973 A | 4/1985 | Payne |
| 4,779,006 A | 10/1988 | Wortham |
| 5,394,016 A | 2/1995 | Hickey |

(Continued)

FOREIGN PATENT DOCUMENTS

| DE | 3049791 A1 * | 1/1983 |
|---|---|---|
| EP | 1845257 A2 | 10/2007 |

(Continued)

OTHER PUBLICATIONS

First Examination Report for corresponding New Zealand Application No. 626491 mailed on Jan. 30, 2015.

(Continued)

*Primary Examiner* — Ninh H Nguyen
*Assistant Examiner* — Christopher R Legendre
(74) *Attorney, Agent, or Firm* — Billion & Armitage

(57) ABSTRACT

An intake assembly for a wind-energy conversion system has a substantially vertical converging nozzle, an object extending into the nozzle, and a converging flow passage between the object and the nozzle. For some embodiments, the object may be another nozzle. There may be vanes in one or both nozzles in further embodiments. The object may be configured to move in yet other embodiments.

21 Claims, 16 Drawing Sheets

(56) References Cited

U.S. PATENT DOCUMENTS

| | | | |
|---|---|---|---|
| 5,553,995 A * | 9/1996 | Martinez | 415/1 |
| 6,043,565 A * | 3/2000 | Les Strange | 290/55 |
| 6,249,059 B1 * | 6/2001 | Hosoda | 290/55 |
| 6,409,466 B1 | 6/2002 | Lamont | |
| 6,510,687 B1 * | 1/2003 | Zaslavsky et al. | 60/398 |
| 6,688,841 B1 | 2/2004 | Wobben | |
| 6,955,049 B2 | 10/2005 | Krouse | |
| 6,979,171 B2 | 12/2005 | Lauritsen | |
| 6,982,498 B2 | 1/2006 | Tharp | |
| 7,400,057 B2 * | 7/2008 | Sureshan | 290/55 |
| 7,811,048 B2 | 10/2010 | Allaei | |
| 7,821,153 B2 | 10/2010 | Gray | |
| 7,872,366 B2 | 1/2011 | Gray | |
| 7,875,992 B2 | 1/2011 | Gray | |
| 7,948,109 B2 | 5/2011 | Gray | |
| 8,192,138 B2 * | 6/2012 | Kelaiditis | 415/4.2 |
| 8,421,265 B2 * | 4/2013 | Gray | 290/55 |
| 8,476,783 B2 * | 7/2013 | Ting | 290/55 |
| 8,651,798 B2 * | 2/2014 | Allaei | 415/1 |
| 2003/0156938 A1 * | 8/2003 | Verini | 415/4.2 |
| 2006/0232075 A1 | 10/2006 | Fraenkel | |
| 2009/0087301 A1 | 4/2009 | Krouse | |
| 2009/0256360 A1 | 10/2009 | Candelas Perez et al. | |
| 2010/0084867 A1 | 4/2010 | Sato | |
| 2010/0133847 A1 | 6/2010 | Allaei | |
| 2010/0213719 A1 | 8/2010 | Botan et al. | |
| 2010/0244453 A1 | 9/2010 | Dornan | |
| 2010/0278629 A1 | 11/2010 | Krippene | |
| 2011/0048008 A1 | 3/2011 | Obadan | |
| 2011/0316279 A1 * | 12/2011 | Bahari et al. | 290/44 |
| 2013/0038068 A1 * | 2/2013 | Tai et al. | 290/55 |
| 2013/0136574 A1 * | 5/2013 | Allaei | 415/1 |
| 2014/0062093 A1 * | 3/2014 | Allaei | 290/55 |
| 2014/0241873 A1 * | 8/2014 | Degala | 415/208.5 |

FOREIGN PATENT DOCUMENTS

| | | | | |
|---|---|---|---|---|
| FR | 529301 A * | 11/1921 | | |
| FR | 56258 E * | 9/1952 | | |
| FR | 2466637 A1 * | 4/1981 | | |
| FR | 2476761 A * | 8/1981 | | |
| GB | 2459499 A * | 10/2009 | | Y02E 10/74 |
| GB | 2484329 A * | 4/2012 | | |
| JP | 05-126026 A | 5/1993 | | |
| JP | 05-141340 A | 6/1993 | | |
| JP | 11-13421 A | 1/1999 | | |
| JP | 2001-012340 A | 1/2001 | | |
| JP | 2007-247516 A | 9/2007 | | |
| JP | 2011-106429 A | 6/2011 | | |
| KR | 20-0323401 Y1 | 8/2003 | | |
| KR | 10-2005-0079970 A | 8/2005 | | |
| KR | 2011-0004689 A | 1/2011 | | |
| KR | 10-2011-0049250 A | 5/2011 | | |
| KR | 10-2011-0078828 A | 7/2011 | | |
| WO | WO 2010050837 A1 * | 5/2010 | | F03D 1/04 |

OTHER PUBLICATIONS

"RORMaxx Automotive", Jan. 6, 2009, retrieved from http://www.autobloggreen.com/photos/rormaxx/1263571, 2 pages.
First Examination Report for related Australian Application No. 2012345809, mailed May 12, 2015, 4 pages.
Extended European Search Report for related European Application No. 10741605.9, mailed Nov. 4, 2014, 6 pages.
Extended European Search Report for related European Application No. 12852623.3, mailed May 29, 2015, 8 pages.
International Preliminary Report on Patentability for related International Application No. PCT/US2010/023554, mailed Aug. 16, 2011, 4 pages.
International Search Report for related International Application No. PCT/US2010/023554, mailed Dec. 7, 2010, 3 pages.
Written Opinion for related International Application No. PCT/US2010/023554, mailed Dec. 7, 2010, 3 pages.
International Preliminary Report on Patentability for related International Application No. PCT/US2010/034494, mailed Nov. 15, 2011, 4 pages.
International Search Report for related International Application No. PCT/US2010/034494, mailed Jan. 3, 2011, 3 pages.
Written Opinion for related International Application No. PCT/US2010/034494, mailed Jan. 3, 2011, 3 pages.
International Preliminary Report on Patentability for related International Application No. PCT/US2012/067211, mailed Jun. 3, 2014, 7 pages.
International Search Report for related International Application No. PCT/US2012/067211, mailed Feb. 26, 2013, 3 pages.

* cited by examiner

US 9,291,148 B2

INTAKE ASSEMBLIES FOR WIND-ENERGY CONVERSION SYSTEMS AND METHODS

FIELD

The present disclosure relates generally to wind energy conversion and, in particular, the present disclosure relates to intake assemblies for wind-energy conversion systems and methods.

BACKGROUND

Due to the recent energy problems that have arisen, considerable interest has been given to converting the kinetic energy of wind into electrical power, e.g., using wind-power generation systems (e.g., that are sometimes called wind-energy conversion systems). For example, some wind-energy conversion systems involve wind flowing through a turbine located atop a substantially vertical tower so that the turbine rotates an electrical generator in response to the wind flowing through the turbine. This causes the electrical generator to produce electrical power.

Such turbines are typically complex machines that may have several sub-machines that convert the kinetic energy of the wind to electrical power. That is, these machines may have a large number of moving parts that are subject to failure and that may require considerable maintenance, resulting in high maintenance costs.

In particular, the power generation depends on the length of the turbine blades, e.g., the longer each turbine blade, the higher the power generation. However, long blades can be costly, take up a large amount of space, and may generate excessive noise and vibration. Longer turbine blades may increase not only the cost of material and installation, but may also increase the cost of maintenance. As such, some current wind-energy conversion systems may suffer from low efficiency, high capital cost, high maintenance costs, and/or unacceptably high noise and vibration.

Turbines with relatively long blades may operate at relatively low rotational speeds (e.g., typically 20 rpm for wind turbines) and may require gears to increase the rotational speed up to rotational speeds that are useful for the generator (e.g., typically 1500 rpm for a 1.5 MW generator). This may involve high levels of torque and accompanying high gear-mesh forces that can cause the gears to fail, thus meaning considerable maintenance to reduce the amount of failures. Because of the low speed of the turbine, the various gearbox components are usually supported by rolling element bearings. These bearings are subject to significant radial loads that can cause the bearings to fail prematurely, thus meaning considerable maintenance to reduce the amount of failures.

Some wind-energy conversion systems may include a yaw system for turning the turbine into the wind. For example, a yaw system may include a motor (e.g., a yaw motor) coupled to a turbine-generator assembly by drive, such as a yaw drive, that may include a gear system. The yaw motor activates the yaw drive that in turn rotates the turbine-generator assembly so that the turbine faces into the wind. However, yaw systems may be complex and expensive, can fail, and may require considerable maintenance. Yaw systems may also be difficult to access, in that they are usually located adjacent to the turbine-generator assembly atop a tower.

For the reasons stated above, and for other reasons stated below which will become apparent to those skilled in the art upon reading and understanding the present specification, there is a need in the art for alternatives to existing wind-energy conversion systems.

SUMMARY

An embodiment of the present invention provides an intake assembly for a wind-energy conversion system that has a substantially vertical converging nozzle, an object extending into the nozzle, and a converging flow passage between the object and the nozzle. For some embodiments, the object may be another substantially vertical converging nozzle. There may be vanes in one or both nozzles in further embodiments. The object may be configured to move in yet other embodiments.

DETAILED DESCRIPTION

Figure 1:
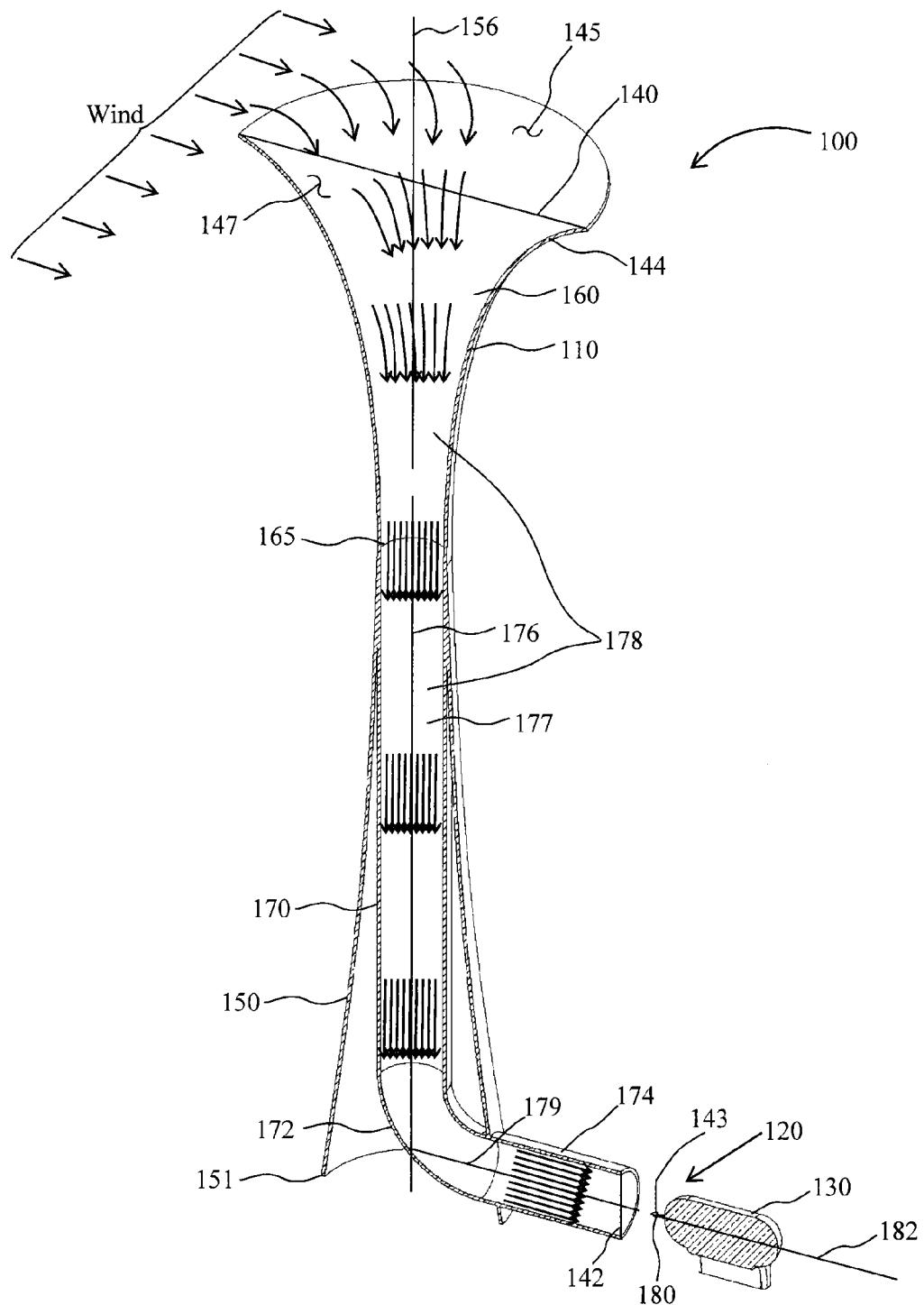
FIG. 1 is a cut-away perspective view of an embodiment of a wind-energy conversion system.

In the following detailed description, reference is made to the accompanying drawings that form a part hereof, and in which is shown, by way of illustration, specific embodiments. In the drawings, like numerals describe substantially similar components throughout the several views. Other embodiments may be utilized and structural and/or electrical changes may be made without departing from the scope of the present disclosure. The following detailed description is, therefore, not to be taken in a limiting sense.

FIG. 1 is a cut-away perspective view of a wind-energy conversion system 100, e.g., that may be referred to as a wind-energy harvester. Wind-energy conversion system 100 includes a turbine-intake tower 110, a turbine 120 fluidly coupled to turbine-intake tower 110, and an electrical generator 130, such as a 60 Hz AC generator, coupled (e.g., mechanically coupled) to turbine 120.

Turbine-intake tower 110 has an inlet 140 and an outlet 142. Wind enters turbine-intake tower 110 through inlet 140, flows through turbine-intake tower 110, and exits turbine-intake tower 110 through outlet 142. The air exiting though outlet 142 passes over blades 143 of turbine 120, as shown in FIG. 1, causing turbine 120 to rotate. Rotation of turbine 120 rotates the generator 130 via a suitable transmission (not shown) that couples turbine 120 to generator 130.

Turbine-intake tower 110 includes a converging nozzle 144, such as a funnel, at the top of a support column 150 of turbine-intake tower 110. Support column 150 may be substantially vertical (e.g., vertical) and acts to support nozzle 144 so that an inlet plane 145 of inlet 140 and inlet 140 are at a vertical height above turbine 120, e.g., above the hub of turbine blades 143. The vertical height of inlet 140 may be about the same vertical height as the hub of a turbine of a conventional wind turbine system, where the turbine is mounted atop a tower. For example, the vertical height may be about 100 to about 200 feet.

Support column 150 has a base 151 that may directly contact the ground. Alternatively, intake tower 110 may be positioned on a platform floating on water, for example, for an offshore application, where base 151 may be adjacent to (e.g., in direct contact with) the platform. Turbine 120 and/or generator 130 may be located at or near ground level, e.g., at about the same vertical level as base 151 and about the same vertical level as outlet 142, as shown in FIG. 1. In other words, turbine 120 and/or generator 130 may be located adjacent to base 151.

Nozzle 144 may be substantially vertical (e.g., vertical). That is, a central longitudinal axis 156 of nozzle 144 may be substantially vertical (e.g., vertical). Nozzle 144 may have progressively smaller cross-sections (e.g., circular cross-sections) in the vertical downward direction, and central longitudinal axis 156 may be the symmetry axis of each of those cross-sections.

Central longitudinal axis 156 may be substantially perpendicular (e.g., perpendicular) to the direction of the wind and to the inlet plane 145. Nozzle 144 may be made of a smooth material in order to reduce losses due to surface friction. For some embodiments, inner surface 147 may have a contour, e.g., a curvature, as shown in FIG. 1. Nozzle 144 may have a substantially conical shape for some embodiments. For other embodiments, nozzle 144 may have a curved sidewall or sidewalls.

The inlet of nozzle 144 is coincident with (e.g., is the same as) the inlet 140 to turbine-intake tower 110. In other words, the inlet of nozzle 144 provides the inlet 140 to turbine-intake tower 110. As such, the inlet to nozzle 144 may also be referred to as inlet 140. The inlet plane 145 of turbine-intake tower 110 may be coincident (e.g., coplanar) with the inlet plane of nozzle 144. As such, the inlet plane of nozzle 144 may also be referred to as inlet plane 145.

Nozzle 144 may open directly to the exterior of turbine-intake tower 110. The inlet plane 145 of nozzle 144 may be circular, as shown in FIG. 1, so that central longitudinal axis 156 is the central axis (e.g., the symmetry axis) of the inlet plane 145 of nozzle 144. The inlet plane 145 of nozzle 144 may form an interface between the exterior surroundings of turbine-intake tower 110 and the interior of nozzle 144, and thus the interior of turbine-intake tower 110. Inlet 140 and inlet plane 145 may be substantially horizontal (e.g., horizontal).

A flow passage 160 within nozzle 144 converges (e.g., tapers) with increasing vertical downward distance into turbine-intake tower 110 from the top of turbine-intake tower 110, starting at the inlet plane 145 and ending at an outlet 165 to nozzle 144. That is, flow passage 160 converges (e.g., becomes smaller) with increasing vertical downward distance into turbine-intake tower 110 from the top of turbine-intake tower 110. Outlet 165 also forms an inlet to a substantially vertical (e.g. a vertical) inner duct 170 that may have a substantially uniform cross-section along its length. For example, nozzle 144 is fluidly coupled to duct 170. For other embodiments, duct 170 may converge (not shown) in the vertical downward direction from nozzle 144 toward the base 151.

The cross-sectional area (perpendicular to the central longitudinal axis 156) of the flow passage 160 within nozzle 144 decreases between the inlet 140 and the outlet 165 of nozzle 144, as shown in FIG. 1. Nozzle 144 acts to increase the flow velocity between inlet 140 and outlet 165. Passing the flow through nozzle 144 causes the flow to converge, as shown in FIG. 1, and thus accelerate. In other words, wind enters nozzle 144 through inlet 140 and is accelerated from inlet 140 to outlet 165. For embodiments where duct 170 converges, the wind may further converge and accelerate within duct 170.

Support column 150 may be hollow. Duct 170 may be located within an interior of support column 150 and may extend from outlet 165 of nozzle 144 to an elbow 172 that is coupled to an outlet duct 174 (e.g., sometimes referred to as a turbine inlet duct) that leads to outlet 142. As such, duct 170 is between and fluidly coupled to nozzle 144 and outlet duct 174.

Duct 170 may be substantially vertical (e.g., vertical). For example, a central longitudinal axis 176 of duct 170 may be substantially vertical (e.g., vertical) and may be substantially collinear (e.g., collinear) with the central longitudinal axis 156 of nozzle 144, as shown in FIG. 1. In other words, nozzle 144 and duct 170 may be substantially vertically (e.g., vertically) aligned.

Flow passage 160 in nozzle 144 and a flow passage 177 in duct 170 may be contiguous and may form a continuous, substantially vertical (e.g., vertical) flow passage 178 that opens to the exterior of turbine-intake tower 110 at the inlet 140 of nozzle 144. For example, flow passage 178 may start at the inlet plane 145 of nozzle 144 and extend substantially vertically (e.g., vertically) to outlet duct 174.

Outlet duct 174 may be substantially horizontal. For example, a central longitudinal axis 179 of outlet duct 174 may be substantially horizontal and may be substantially perpendicular (e.g., perpendicular) to the central longitudinal axis 176 of duct 170 and substantially perpendicular (e.g., perpendicular) to the central longitudinal axis 156 of nozzle 144, as shown in FIG. 1.

Elbow 172 and outlet duct 174 direct wind from duct 170 onto the blades 143 of turbine 120. As such, outlet duct 174 is fluidly coupled to turbine 120 and fluidly couples duct 170 and nozzle 144 to turbine 120. The flow velocity at outlet 142, i.e., at the outlet of turbine-intake tower 110 and of duct 174, may be called the turbine inlet velocity.

Turbine 120 has a shaft 180 that may be substantially horizontal (e.g., horizontal), i.e., shaft 180 may have a central longitudinal axis 182 that is substantially horizontal (e.g., horizontal) and that is substantially parallel (e.g., parallel) to the central longitudinal axis 179 of outlet duct 174. For example, turbine 120 may be referred to as a horizontal-axis turbine.

The central longitudinal axis 179 of outlet duct 174 and the central longitudinal axis 182 of shaft 180 may be substantially collinear (e.g., collinear). Note that for this embodiment, the wind velocity at outlet 142 of turbine-intake tower 110 may be substantially horizontal. The central longitudinal axis 182 of shaft 180 may be substantially perpendicular (e.g., perpendicular) to the central longitudinal axis 176 of duct 170 and to the central longitudinal axis 156 of nozzle 144.

Alternatively, for another embodiment, elbow 172 and outlet duct 174 may be omitted, and a turbine 120 may be located at the exit of duct 170 so that its shaft 180 is substantially vertical (e.g., vertical). For example, the central longitudinal axis 182 of shaft 180 may be substantially vertical (e.g., vertical) and substantially collinear (e.g., collinear) with the central longitudinal axis 176 of duct 170 and with the central longitudinal axis 156 of nozzle 144. In this embodiment, turbine 120 may be referred to as a vertical-axis turbine. For example, duct 170 may be directly fluidly coupled to turbine 120.

Note that the wind velocity at the exit of duct 170 is the turbine inlet velocity for the vertical-axis turbine embodiment and that turbine 120 receives the wind directly from duct 170. As such, the exit of duct 170 is the outlet of turbine-intake tower 110, meaning that the velocity at the outlet of turbine-intake tower 110 is substantially vertical. For a vertical-axis turbine, flow passage 178 opens to the exterior of turbine-intake tower 110 at the inlet plane 145, and thus inlet 140, of nozzle 144 (e.g., starts at the inlet plane 145 of nozzle 144) and extends to the vertical-axis turbine.

Elbow 172 may have a radius of curvature that acts to keep flow losses relatively low. In addition, the losses in outlet duct 174 may be relatively small. Therefore, the wind velocity at the exit of duct 170 and the exit of outlet duct 174 may be substantially the same. The inner surfaces of elbow 172, duct 170, and outlet duct 174 may be made of a smooth material in order to reduce losses due to surface friction. Turbulence suppressors may be implemented to reduce turbulence in elbow 172, nozzle 144, duct 170, and outlet duct 174 that may result from imperfections and anomalies in elbow 172, nozzle 144, duct 170, and outlet duct 174.

During operation, nozzle 144 receives and accelerates the wind as the wind is flowing substantially vertically (e.g., vertically) downward. Duct 170 receives the accelerated wind from nozzle 144 and directs it substantially vertically (e.g., vertically) downward to elbow 172 for embodiments where turbine 120 is a horizontal-axis turbine. For embodiments where duct 170 converges, duct 170 further accelerates the wind as the wind is flowing therethrough.

Elbow 172 directs the wind to outlet duct 174 by turning the wind by substantially 90 degrees. Outlet duct 174 directs the wind to turbine 120, e.g., when turbine 120 is a horizontal-axis turbine. For another embodiment, e.g., when turbine 120 is a vertical-axis turbine, turbine 120 may receive the wind directly from duct 170 while the wind is flowing substantially vertically (e.g., vertically) downward.

Figure 2:
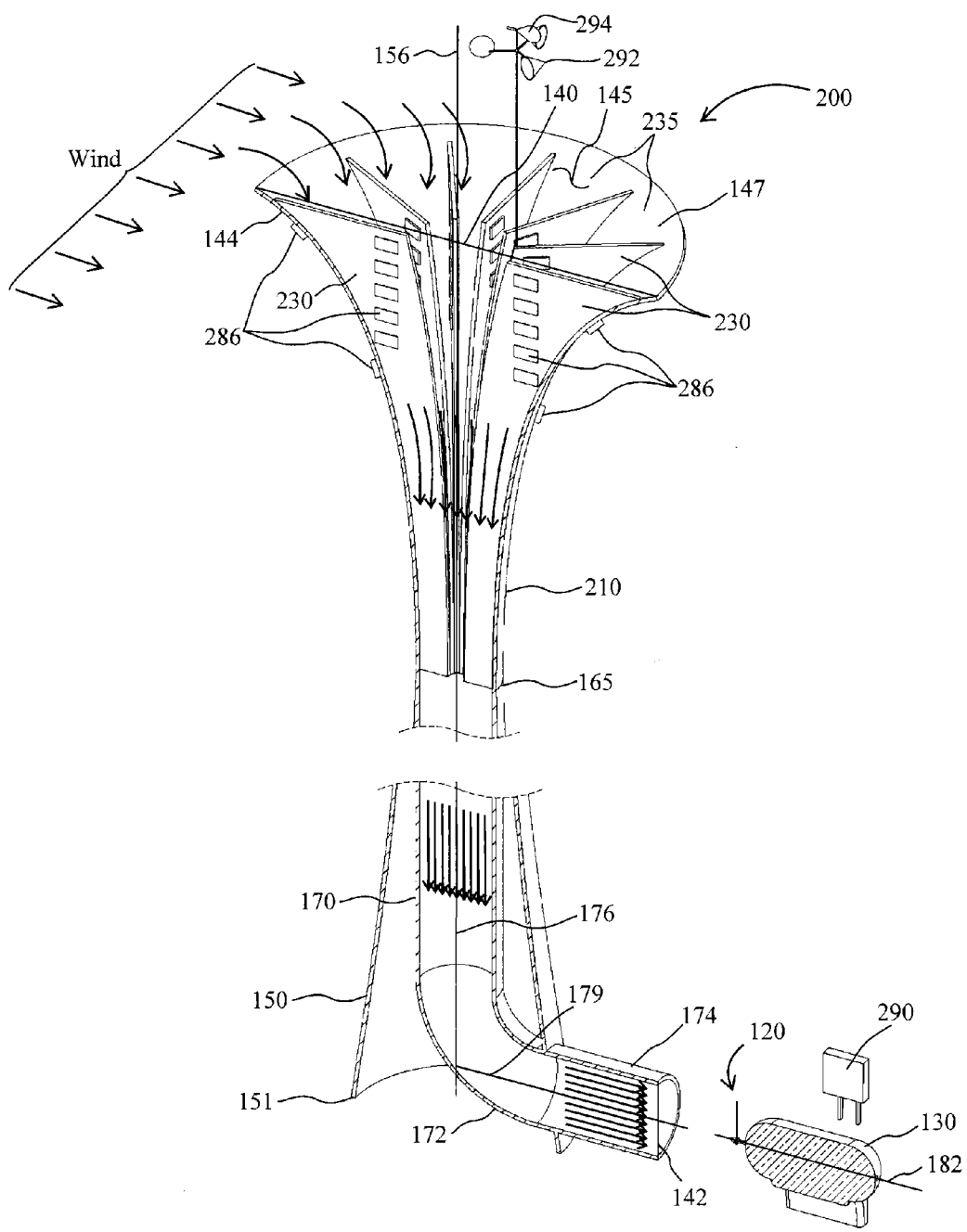
FIG. 2 is a cut-away perspective view of another embodiment of a wind-energy conversion system.

FIG. 2 is a cut-away perspective view of a wind-energy conversion system 200 having a turbine-intake tower 210. Common numbering is used in FIGS. 1 and 2 to identify components common to FIGS. 1 and 2. The common components may be as discussed above in conjunction with FIG. 1.

Wind-energy conversion system 200 may be substantially the same (e.g., may be the same) as wind-energy conversion system 100, except that vanes 230 extend into the interior of nozzle 144 from inner surface 147 of nozzle 144. For example, vanes 230 may extend substantially radially (e.g., radially) into the interior of nozzle 144 from inner surface 147 of nozzle 144. Vanes 230 may also extend axially (e.g., vertically downward) from inlet 140 (or from a location adjacent to inlet 140) to outlet 165 of nozzle 144.

Vanes 230 may be distributed around the entire perimeter (e.g., the circumference) of inner surface 147 to produce (e.g., define) a plurality flow passages 235, where each flow passage 235 is between successively adjacent vanes 230, as shown in FIG. 2. Therefore, there is a plurality of flow passages 235. Vanes 230 may be made of a smooth material in order to reduce losses due to surface friction.

Each flow passage 235 may converge (e.g., taper) with increasing vertical downward distance into nozzle 144 from the top of nozzle 144, starting at inlet 140 and ending at outlet 165 to nozzle 144. That is, each flow passage 235 converges (e.g., becomes smaller) with increasing vertical downward distance into nozzle 144. Each flow passage 235 may terminate at and open into duct 170.

During operation, each flow passage 235 of nozzle 144 receives and accelerates the wind. Duct 170 receives the accelerated wind from each flow passage 235. After the wind is received by duct 170, the wind may proceed to turbine 120, as described above in conjunction with FIG. 1.

For some embodiments, actuators 286, e.g., piezoelectric actuators, may be physically coupled to the outer surface of nozzle 144 and/or physically coupled to one or more of vanes 230, as shown in FIG. 2. For example, actuators 286 may be coupled in direct physical contact with the outer surface of nozzle 144 and/or with the surfaces of vanes 230. Actuators 286 are electrically coupled to a controller 290 for receiving electrical signals from controller 290.

A wind-speed sensor, such as an anemometer 292, may be located above the top of turbine-intake tower 210 for sensing the wind speed external to the turbine-intake tower 210. Anemometer 292 may be electrically coupled to controller 290 for sending electrical signals to controller 290 indicative of the sensed wind speed. A wind vane 294 may be located above the top of turbine-intake tower 210 and may be electrically coupled to controller 290 for sending electrical signals to controller 290 indicative of the sensed wind direction.

In response to receiving signals indicative of the wind speed from anemometer 292, controller 290 may send electrical signals to actuators 286. The actuators 286 coupled to nozzle 144 may then adjust the shape (e.g., contour) and/or size of nozzle 144 by exerting forces directly on the outer surface of nozzle 144 in response to receiving the electrical signals from controller 290. That is, the shape and/or size of nozzle 144 may be adjusted based on the wind speed. For example, actuators 286 may adjust a particular diameter of nozzle 144 at a particular vertical distance from inlet plane 145. By adjusting the size and/or shape of nozzle 144, actuators 286 can adjust the amount of convergence (e.g., taper) of nozzle 144.

Controller 290 may store voltage values corresponding to the voltages that might be applied to an actuator 286 to set a particular diameter of nozzle 144 to a certain numerical value. The certain numerical value may correspond to a diameter that provides a certain increase in velocity and/or reduced losses for a certain wind velocity for a certain power output.

For example, anemometer 292 might detect a wind speed and send a signal indicative of the wind speed to controller 290. Controller 290 may then determine a particular velocity at outlet 142 (e.g., horizontal-axis turbine) or at the outlet of duct 170 (e.g., vertical-axis turbine) to produce a certain power. Controller 290 may further determine how much voltage that might be applied to actuators 286 to adjust the size and/or shape of nozzle 144 in order to produce the particular velocity at outlet 142 or at the outlet of duct 170 for the detected wind speed. For example, controller 290 may instruct actuators 286 to adjust the convergence of nozzle 144 to produce the particular velocity at outlet 142 or at the outlet of duct 170.

Similarly, controller 290 may adjust the size and/or shape of nozzle 144 to reduce flow losses based on a detected wind speed. For example, controller 290 may adjust the convergence of nozzle 144 to reduce flow losses based on a detected wind speed.

The actuators 286 coupled to successively adjacent vanes 230 may adjust the shape (e.g., contour) and/or size of each flow passage 235 between the successively adjacent vanes 230 by exerting forces directly on the surfaces of the successively adjacent vanes 230 in response to receiving electrical signals from controller 290 based on the wind speed. That is, the size and/or shape (e.g., the amount of convergence) of each flow passage 235 between the successively adjacent vanes 230 may be adjusted based on the wind speed.

Controller 290 may also store voltage values corresponding to the voltages that might be applied to the actuators 286 coupled to successively adjacent vanes 230 to set a size and/or shape of the flow passage 235 between the successively adjacent vanes 230 to provide an increase in velocity of the wind through the flow passage 235 and/or reduced losses for a certain wind velocity for a certain power output.

For example, anemometer 292 might detect a wind speed and send a signal indicative of the wind speed to controller 290. Controller 290 may then determine a particular velocity at outlet 142 or at the outlet of duct 170 to produce a certain power. Controller 290 may further determine how much voltage might be applied to the actuators 286 coupled to successively adjacent vanes to adjust the size and/or shape (e.g., the amount of convergence) of the flow passage 235 between the successively adjacent vanes 230 in order to produce the particular velocity at outlet 142 or at the outlet of duct 170 for the detected wind speed. For some embodiments, the actuators 286 coupled to nozzle 144 and vanes 230 may be adjusted concurrently based on the wind speed.

Note that the actuators 286 discussed heretofore and hereinafter are responsive to receiving electrical signals from controller 290. For example, for some embodiments, the actuators 286 may exert forces directly on surfaces to which they may be directly attached in response to receiving electrical signals from controller 290.

Figure 3:
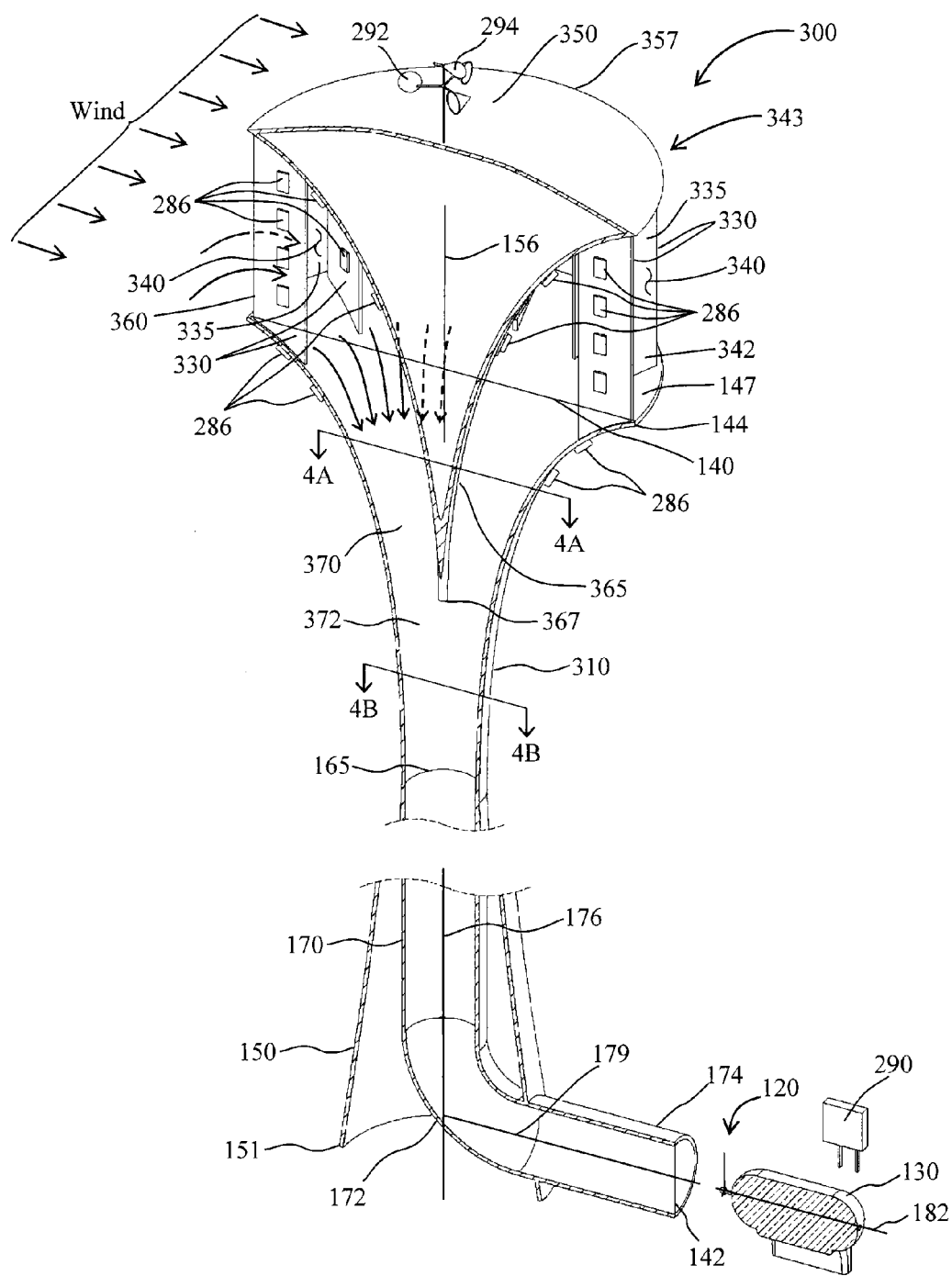
FIG. 3 is a cut-away perspective view of another embodiment of a wind-energy conversion system.

FIG. 3 is a cut-away perspective view of a wind-energy conversion system 300 having a turbine-intake tower 310 with an intake assembly 343 located at the top of support column 150, and thus turbine-intake tower 310. Common numbering is used in FIGS. 1 and 3 to identify components common to FIGS. 1 and 3. The common components may be as discussed above in conjunction with FIG. 1.

Intake assembly 343 may include vanes 330 that may extend substantially vertically (e.g., vertically) upward from inner surface 147 of nozzle 144 of intake assembly 343 to an object, such as a deflector 365, of intake assembly 343. Lower edges of vanes 330 may be in direct contact with the inner surface 147 of nozzle 144 and upper edges of vanes 330 may be in direct contact with deflector 365. Deflector 365 and vanes 330 may be made of a smooth material in order to reduce losses due to surface friction.

Vanes 330 may be distributed around the entire perimeter (e.g., the circumference) of inner surface 147 to produce a plurality of converging flow passages 335, where each flow passage 335 is between successively adjacent vanes 330, as shown in FIG. 3. An inlet plane 340 of each flow passage 335 may be substantially parallel (e.g., parallel) to central longitudinal axis 156, and thus the inlet plane 340 of each flow passage 335 may be substantially vertical (e.g., vertical). Each inlet plane 340 corresponds to an inlet 342, meaning each inlet 342 may be substantially vertical (e.g., vertical). For some embodiments, each flow passage 335 may converge (e.g., become smaller) in a direction from a location adjacent to an outer edge of nozzle 144 (e.g., from inlet plane 340) toward the interior of nozzle 144.

Inlets 342 are inlets to turbine-intake tower 310, and thus intake assembly 343. Therefore, for some embodiments, intake assembly 343 has a plurality of substantially vertical (e.g., vertical) discrete inlets 342 distributed around the entire perimeter of intake assembly 343 and between deflector 365 and nozzle 144. Inlets 342 allow wind to enter intake assembly 343 from substantially any prevailing wind direction, e.g., at substantially any location around the entire perimeter of intake assembly 343. For example, wind may enter intake assembly 343 at substantially 360 degrees (e.g., at 360 degrees) around the perimeter of intake assembly 343. This avoids the need for turning an inlet of a wind-energy conversion system or a turbine of a wind-energy conversion system into the wind, e.g., thereby eliminating a yaw system that is sometimes used to turn an inlet of a wind-energy conversion system or a turbine of a wind-energy conversion system into the wind.

Intake assembly 343 may include a cover 350 over (e.g., as a portion of) deflector 365. An outer edge 357 of cover 350 may be adjacent to an outer side 360 of each of vanes 330 and thus may be adjacent to the inlet plane 340, and thus the inlet 342, of each flow passage 335. For some embodiments, cover 350 may be domed, as shown in FIG. 3.

Deflector 365 may extend downward into the interior of nozzle 144 from a location vertically above nozzle 144 (e.g., from cover 350), e.g., deflector 365 may extend past inlet 140 of nozzle 144. For example, deflector 365 may be referred to as being nested within nozzle 144. For some embodiments, nozzle 144, deflector 365, and vanes 330 may form the intake assembly 343 of turbine-intake tower 310, e.g., at the top of support column 150, where intake assembly 343 is fluidly coupled to duct 170 and thus turbine 120. Note that turbine 120 may be located adjacent to the base 151 of turbine-intake tower 310.

Deflector 365 may converge (e.g., taper) inwardly from a location adjacent to the outer edge of intake assembly 343 to substantially a point (e.g., indicated by reference number 367) at central longitudinal axis 156 of nozzle 144, as shown in FIG. 3. In other words, deflector 365 converges (tapers) inwardly with increasing vertical downward distance into turbine-intake tower 310 from a location adjacent to the top of turbine-intake tower 310, and thus intake assembly 343. For some embodiments, deflector 365 may have a concave curvature when viewed from inner surface 147 of nozzle 144.

A converging flow passage 370 may be between deflector 365 and the inner surface 147 of nozzle 144. Each flow passage 335 may open into converging flow passage 370, where converging flow passage 370 converges (e.g., becomes smaller) in a direction into intake assembly 343. Note that for some embodiments, intake assembly 343 is configured to allow wind to enter flow passage 370 from substantially any prevailing wind direction.

For some embodiments, converging flow passage 370 may be curved, as shown in FIG. 3. For example, flow passage 370 may be configured to turn a wind-flow toward a vertical downward direction while causing the wind-flow to converge and accelerate. That is, flow passage 370 may converge along the curved path.

Deflector 365 may be substantially coaxial with (e.g., coaxial with) nozzle 144. For example, deflector 365 and nozzle 144 may share the substantially vertical (e.g., the vertical) central longitudinal axis 156, e.g., central longitudinal axis 156 is a central longitudinal axis for both deflector 365 and nozzle 144. In other words, central longitudinal axis 156 is common to deflector 365 and nozzle 144. That is, deflector 365 and nozzle 144 may be substantially vertically aligned with (e.g., vertically aligned with) each other. Deflector 365 and nozzle 144 may be substantially vertically aligned with (e.g., vertically aligned with) duct 170 for some embodiments.

Figure 4A:
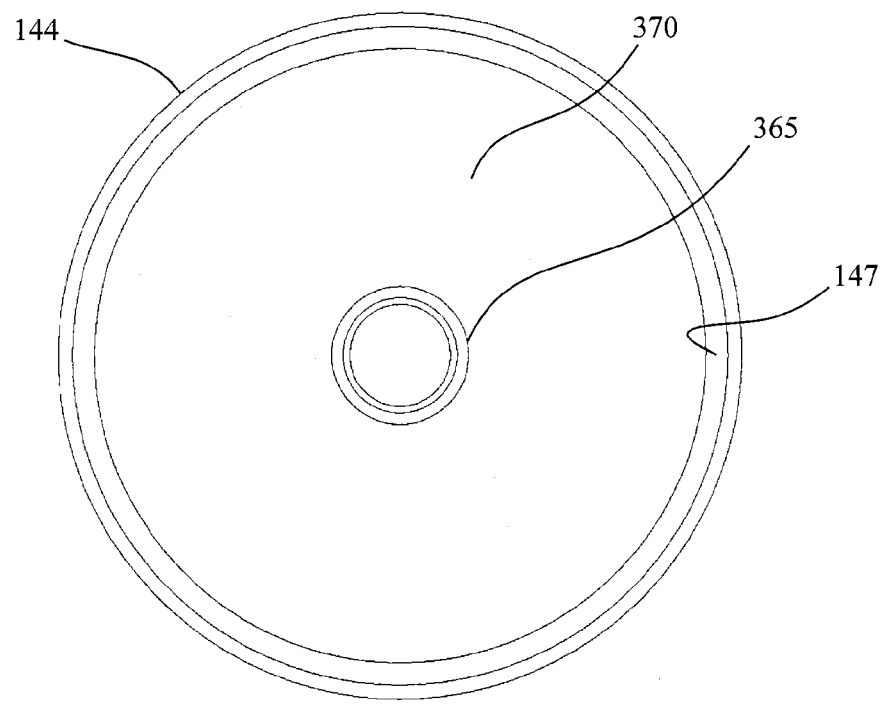
FIG. 4A is a cross-section viewed along line 4A-4A in FIG. 3.

Flow passage 370 may be an annulus between deflector 365 and inner surface 147 of nozzle 144, as shown in FIG. 4A, a cross-section viewed along line 4A-4A in FIG. 3. For some embodiments, flow passage 370 may terminate within nozzle 144 where deflector 365 terminates, i.e., before outlet 165 of nozzle 144 (e.g., at a vertical distance above outlet 165), as indicated by reference number 367 in FIG. 3.

Figure 4B:
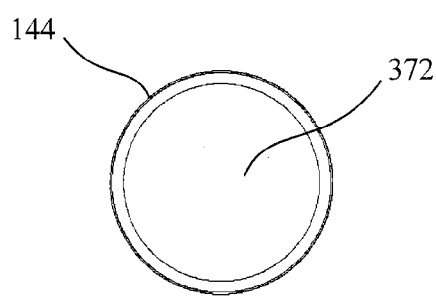
FIG. 4B is a cross-section viewed along line 4B-4B in FIG. 3.

Annular flow passage 370 may transition to a flow passage 372 within nozzle 144, e.g., having a circular cross-section, as shown in FIG. 4B, a cross-section viewed along line 4B-4B in FIG. 3. For example, flow passage 372 may be a portion of the converging flow passage 160 (FIG. 1) of nozzle 144. Nozzle 144, and thus flow passage 372, may continue to converge (e.g., taper) from where deflector 365 terminates to outlet 165 of nozzle 144. For some embodiments, nozzle 144 may be curved after deflector 365 terminates.

During operation, wind is received at the inlet 342 of each flow passage 335. As the wind flows through each flow passage 335, it converges and thus accelerates. As the accelerating wind flows through each flow passage 335, it may be turned by the curvature of the respective flow passage 335, e.g., toward a vertical downward direction. The accelerated wind is then received in flow passage 370 from each flow passage 335. For example, the exterior surface of deflector 365 deflects the wind into nozzle 144 so that the wind flows through flow passage 370.

As the wind flows through flow passage 370, it converges and thus accelerates. As the accelerating wind flows through flow passage 370, it may be turned further, by the curvature of flow passage 370, toward the vertical downward direction. Note that the converging, accelerating wind in flow passage 370 may have a substantially annular cross-section.

The accelerated wind is then received in flow passage 372 from flow passage 370. The wind flow may transition, from a flow with a substantially annular cross-section in flow passage 370 to a flow with a substantially circular cross-section, for example, in flow passage 372, as the wind flow exits flow passage 370 and enters in flow passage 372. As the wind flows through flow passage 372, it converges and thus accelerates. For some embodiments, as the accelerating wind flows through flow passage 372, it may be turned further, by the curvature of flow passage 372, toward the vertical downward direction.

The wind may be substantially horizontal upstream of an inlet 342 of intake assembly 343. The wind may be turned, as it flows from an inlet 342 to the outlet 165 of nozzle 144, toward the vertical downward direction, so that the wind flow is substantially vertical at outlet 165 of nozzle 144. Duct 170 receives the accelerated, substantially vertical wind flow, e.g., with a circular cross-section, from flow passage 372. After the wind is received by duct 170, the wind may proceed to turbine 120 as described above in conjunction with FIG. 1.

For some embodiments, actuators 286 may be physically coupled to one or more of vanes 330, as shown in FIG. 3, and may be electrically coupled to controller 290 for receiving electrical signals from controller 290. For example, actuators 286 may be coupled in direct physical contact with the surfaces of vanes 330. Actuators 286 may also be coupled in direct physical contact with the outer surface of deflector 365 and/or in direct physical contact with the outer surface of nozzle 144, as shown in FIG. 3, and may be electrically coupled to controller 290 for receiving electrical signals from controller 290. In other words, one or more actuators may be coupled to at least one of the outer surface of deflector 365, the outer surface of nozzle 144, and the surfaces of vanes 330.

In response to receiving signals indicative of the wind speed from anemometer 292, controller 290 may send electrical signals to actuators 286. The actuators 286 coupled to deflector 365 may then adjust the size and/or shape (e.g., the amount of convergence) of deflector 365 by exerting forces directly on the outer surface of deflector 365 in response to receiving the electrical signals from controller 290. That is, the size and/or shape of deflector 365 may be adjusted based on the prevailing wind speed external to flow passage 370 and nozzle 144.

For example, the size and/or shape of the flow passage 370 between deflector 365 and the inner surface 147 of nozzle 144 may be adjusted by adjusting the size and/or shape of deflector 365 using the actuators 286 coupled to deflector 365 and/or by adjusting the size and/or shape of nozzle 144 using the actuators 286 coupled to nozzle 144. In addition, the turning radius (e.g., the radius of curvature) of the flow passage 370 may be adjusted by adjusting the actuators 286 coupled to deflector 365 and/or nozzle 144. The actuators 286 coupled to deflector 365 may adjust the size and/or shape of deflector 365 in response to receiving the electrical signals from controller 290 and/or actuators 286 coupled to nozzle 144 may adjust the size and/or shape of nozzle 144 in response to receiving the electrical signals from controller 290.

Controller 290 may store voltage values corresponding to the voltages that might be applied to the actuators 286 coupled to nozzle 144 and/or to the actuators 286 coupled to deflector 365 to set the size and/or shape of the flow passage 370 that provides a certain increase in velocity and/or reduced losses for a certain wind velocity for a certain power output. For example, anemometer 292 might detect a wind speed and send a signal indicative of the wind speed to controller 290. Controller 290 may determine how much voltage might be applied to the actuators 286 to set the size and/or shape of the flow passage 370 in order to produce a particular velocity at outlet 142 or at the outlet of duct 170 for the detected wind speed.

The actuators 286 coupled to successively adjacent vanes 330 may adjust the size and/or shape (e.g., the amount of convergence) of a flow passage 335 between the successively adjacent vanes 330 by exerting forces directly on the surfaces of the successively adjacent vanes 330 based on the wind speed. That is, the size and/or shape of each flow passage 335 between successively adjacent vanes 330 may be adjusted based on the wind speed. Controller 290 may send electrical signals to the actuators 286 coupled to vanes 330. The actuators 286 coupled to vanes 330 may then adjust the size and/or shape of each flow passage 335 between successively adjacent vanes 330 by exerting forces directly on the surface of vanes 330 in response to receiving the electrical signals from controller 290.

Controller 290 may also store voltage values corresponding to the voltages that might be applied to the actuators 286 coupled to successively adjacent vanes 330 to set the size and/or shape of each flow passage 335 between successively adjacent vanes 330 to provide an increase in velocity of the wind through each flow passage 335 and/or reduced losses for a certain wind velocity for a certain power output.

For example, anemometer 292 might detect a wind speed and send a signal indicative of the wind speed to controller 290. Controller 290 may then determine a particular velocity at outlet 142 or at the outlet of duct 170 to produce a certain power. Controller 290 may further determine how much voltage that might be applied to the actuators 286 coupled to the successively adjacent vanes 330 to adjust the size and/or shape of each flow passage 335 between the successively adjacent vanes 330 in order to produce the particular velocity at outlet 142 or at the outlet of duct 170 for the detected wind speed. For some embodiments, the size and/or shape of a flow passage 335 may be adjusted in conjunction with, e.g., substantially concurrently with, adjusting the size, shape, and/or radius of curvature of flow passage 370.

Figure 5:
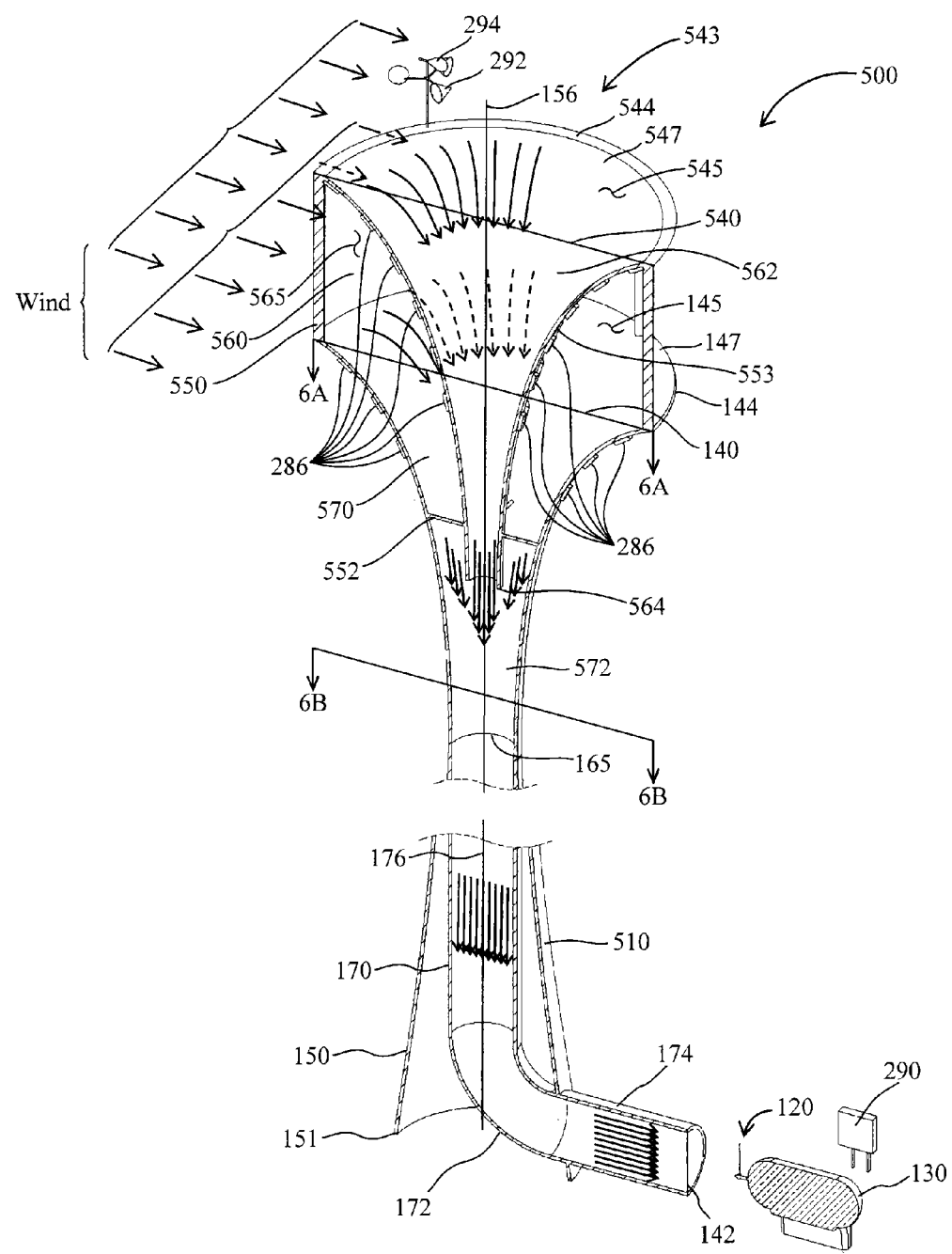
FIG. 5 is a cut-away perspective view of another embodiment of a wind-energy conversion system.

FIG. 5 is a cut-away perspective view of a wind-energy conversion system 500 having a turbine-intake tower 510 with an intake assembly 543 located at the top of support column 150 and thus turbine-intake tower 510. Common numbering is used in FIGS. 1 and 5 to identify components common to FIGS. 1 and 5. The common components may be as discussed above in conjunction with FIG. 1.

Intake assembly 543 includes nozzle 144 and a nozzle 544, such as a funnel. For example, nozzle 544 may be said to be nested within nozzle 144. Intake assembly 543 is fluidly coupled to duct 170 and thus turbine 120. Note that turbine 120 may be adjacent to the base 151 of turbine-intake tower 510.

Nozzles 144 and 544 may be substantially coaxial (e.g., coaxial), where central longitudinal axis 156 of nozzle 144 is also the central longitudinal axis of nozzle 544. For example, nozzles 144 and 544 may share the substantially vertical (e.g., the vertical) central longitudinal axis 156, e.g., central longitudinal axis 156 is a central longitudinal axis for both of nozzles 144 and 544. In other words, central longitudinal axis 156 is common to nozzles 144 and 544. As such, nozzles 144 and 544 are substantially vertical (e.g., vertical). Nozzles 144 and 544 may be substantially vertically aligned with (e.g., vertically aligned with) each other and with duct 170.

For some embodiments, nozzle 544 may be substantially the same (e.g., the same) as nozzle 144. For example, nozzles 144 and 544 may be substantially conical in shape. For other embodiments, nozzles 144 and 544 may have curved sidewalls. Nozzle 544 may be made of a smooth material in order to reduce losses due to surface friction.

Nozzle 544 may include an inlet 540 and an inlet plane 545 that are respectively a first inlet and a first inlet plane of intake assembly 543, where inlet 540 and inlet plane 545 may be substantially horizontal (e.g., horizontal). For some embodiments, inlet plane 145 of nozzle 144 and inlet plane 545 of nozzle 544 are substantially parallel (e.g., parallel) to each other and are substantially perpendicular (e.g., perpendicular) to central longitudinal axis 156.

Inlet plane 145 and inlet 140 of nozzle 144 may be at a different vertical level than inlet plane 545 and inlet 540 of nozzle 544. For example, inlet plane 545, and thus inlet 540, of nozzle 544 may be at a vertical level that is above inlet plane 145, and thus inlet 140, of nozzle 144. In other words, nozzle 544 may extend from a vertical level above nozzle 144 and into nozzle 144.

Supports 550 and 552 may be used to couple nozzle 544 to nozzle 144, as shown in FIG. 5. Supports 550 may extend across an opening 560 around a circumference of intake assembly 543. For example, each of supports 550 may be coupled to inner surface 147 of nozzle 144, may extend to an exterior surface 553 of nozzle 544, and may be coupled to exterior surface 553. Opening 560 may be between nozzle 544 and nozzle 144.

Nozzle 544 may include a converging flow passage 562 defined by an inner surface 547 of nozzle 544. The flow passage 562 within nozzle 544 converges (e.g., tapers) with increasing vertical downward distance into intake assembly 543 from the top of intake assembly 543, starting at the inlet plane 545 and ending at an outlet 564 of nozzle 544 that opens into the converging flow passage in nozzle 144. In other words, nozzle 544 converges (e.g., becomes smaller) with increasing vertical downward distance into intake assembly 543 from the top of intake assembly 543.

Exterior surface 553 may act as a deflector configured to deflect wind into nozzle 144 in a manner similar to deflector 365 in FIG. 3. As such, nozzle 544 may be referred to as an object, such as an open deflector, with a converging flow passage 562 therethrough.

Nozzle 544 may open directly to the exterior of turbine-intake tower 510. The inlet plane 545 of nozzle 544 may be circular, as shown in FIG. 1, so that central longitudinal axis 156 is the central axis (e.g., the symmetry axis) of the inlet plane 545 of nozzle 544. The inlet plane 545 of nozzle 544 may form an interface between the exterior surroundings of intake assembly 543 and the interior of nozzle 544 and thus the interior of intake assembly 543. Inlet 540 and inlet plane 545 may be substantially horizontal (e.g., horizontal) and substantially perpendicular (e.g., perpendicular) to central longitudinal axis 156.

For some embodiments, opening 560 may form a second inlet to intake assembly 543. For example, a plane 565 of opening 560 may be substantially vertical (e.g., vertical) and substantially parallel (e.g., parallel) to central longitudinal axis 156, so that opening 560 may form a substantially vertical (e.g., vertical) second inlet to intake assembly 543. The second inlet of intake assembly 543 formed by opening 560 and the first inlet of intake assembly 543, corresponding to inlet 540 of nozzle 544, may be substantially perpendicular (e.g., perpendicular) to each other. Plane 565 of opening 560 may form a second inlet plane of intake assembly 543.

The second inlet to intake assembly 543 formed by opening 560 may extend around the substantially an entire perimeter (e.g., circumference) of intake assembly 543. As such, both the first and second inlets allow wind to enter intake assembly 543 from substantially any prevailing wind direction. For example, wind may enter intake assembly 543 at substantially 360 degrees (e.g., at 360 degrees) around intake assembly 543. This avoids the need for turning an inlet of a wind-energy conversion system or a turbine of a wind-energy conversion system into the wind, e.g., thereby eliminating a need for yaw system.

Nozzle 544 may extend into the interior of nozzle 144. For example, nozzle 544 may extend past inlet 140 of nozzle 144. Opening 560 forms an inlet to a flow passage 570 between and bounded by inner surface 147 of nozzle 144 and exterior surface 553 of nozzle 544. Flow passage 570 may extend from opening 560 to a location within nozzle 144 where nozzle 544 terminates, e.g., adjacent to outlet 564 of nozzle 544. For example, flow passage 570 and nozzle 544 may terminate before (e.g., vertically above) outlet 165 of nozzle 144. Flow passage 570 may converge from opening 560 to the location within nozzle 144 where nozzle 544 terminates. Flow passage 570 may be curved for some embodiments, as shown in FIG. 5.

Figure 6A:
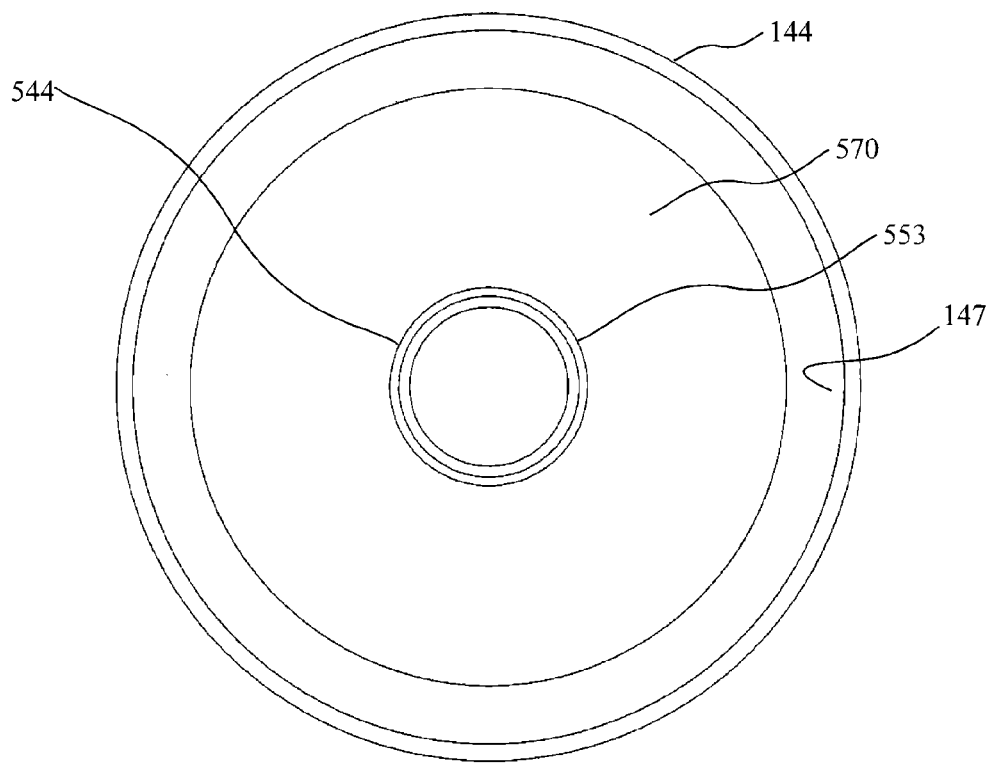
FIG. 6A is a cross-section viewed along line 6A-6A in FIG. 5.
Figure 6B:
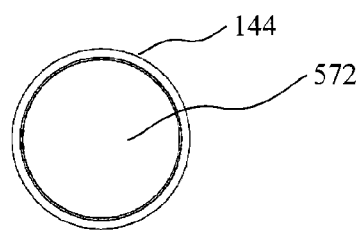
FIG. 6B is a cross-section viewed along line 6B-6B in FIGS. 5 and 7.

Flow passage 570 may pass through inlet 140 of nozzle 144. Flow passage 570 may become an annulus substantially at inlet 140 of nozzle 144, as shown in FIG. 6A, a cross-section viewed along line 6A-6A in FIG. 5. Annular flow passage 570 may transition, where it terminates within nozzle 144, to a flow passage 572 within (e.g., of) nozzle 144, e.g., having a circular cross-section, and extending from outlet 564 of nozzle 544 to outlet 165 of nozzle 144, as shown in FIG. 5 and FIG. 6B, a cross-section viewed along line 6B-6B in FIGS. 5 and 7. Flow passage 572 is a portion of the flow passage 160 (FIG. 1) of nozzle 144. Flow passage 572 extends substantially vertically (e.g., vertically) below nozzle 544, e.g., substantially vertically below outlet 564 of nozzle 544.

Converging flow passage 562 of nozzle 544 opens into flow passage 572 at its outlet 564. Nozzle 144, and thus flow passage 572, may continue to converge (e.g., taper) from outlet 564 of nozzle 544 to outlet 165 of nozzle 144. That is, nozzle 144, and thus flow passage 572, may continue to converge (e.g., become smaller) with increasing vertical downward distance into intake assembly 543 from outlet 564 of nozzle 544 to outlet 165 of nozzle 144.

During operation, wind is received at the inlet 540 to nozzle 544 and at the opening (e.g., inlet) 560 to flow passage 570. As the wind flows from inlet 540 through flow passage 562 of nozzle 544, it converges and thus accelerates. The accelerated wind exits flow passage 562 at the outlet 564 of nozzle 544 and is received in flow passage 572. The wind flowing through flow passage 562 of nozzle 544 may have a decreasing substantially circular cross-section until it exits at the outlet 564.

As the wind flows from inlet 560 through the flow passage 570 between exterior surface 553 of nozzle 544 and interior surface 147 of nozzle 144, it converges and thus accelerates. For example, the exterior surface 553 of nozzle 544 may deflect the wind into nozzle 144 so that the wind flows through flow passage 570. The accelerated wind exits flow passage 570 where nozzle 544 terminates within nozzle 144, e.g., adjacent to outlet 564 of nozzle 544, and is received in flow passage 572. Note that the wind may flow substantially concurrently through (e.g., concurrently through) flow passages 562 and 570. For example, the wind is accelerated in flow passage 562 while the wind is accelerated in flow passage 570.

As the accelerating wind flows through flow passage 570, it may be turned, by the curvature of flow passage 570, toward a vertical downward direction. The wind flowing through flow passage 570 may have a decreasing substantially annular cross-section from inlet 140 of nozzle 144 until it exits flow passage 570.

The wind transitions, from a flow with a substantially annular cross-section in flow passage 570 to a flow with a substantially circular cross-section, for example, in flow passage 572, as the wind exits flow passage 570 and enters flow passage 572. Note that the wind flowing in flow passage 562 from inlet 544 to flow passage 572 and the wind flowing in flow passage 570 from inlet 560 to flow passage 572 may be substantially coaxial (e.g., coaxial).

The accelerated wind from flow passage 570, e.g., with the substantially annular cross-section, merges with the accelerated wind, e.g., with the substantially circular cross-section, from flow passage 562 in flow passage 572 to produce a substantially single wind flow (e.g., a single wind flow) with a substantially circular cross-section, for example, as shown in FIG. 5 in conjunction with FIG. 6B. As the wind flows through flow passage 572, it converges and thus accelerates. For some embodiments, the accelerating wind flowing through flow passage 572 may be substantially vertically downward.

Duct 170 receives the accelerated, substantially vertical wind flow, e.g., with a substantially circular cross-section, from flow passage 572. After the wind flow is received by duct 170, the wind may proceed to turbine 120, as described above in conjunction with FIG. 1.

For some embodiments, actuators 286 may be coupled in direct physical contact with the outer surface 553 of nozzle 544, as shown in FIG. 5, and may be electrically coupled to controller 290 for receiving electrical signals from controller 290. In response to receiving signals indicative of the wind speed from anemometer 292, controller 290 may send electrical signals to actuators 286. The actuators 286 coupled to nozzle 544 may then adjust the size and/or shape (e.g., the amount of convergence), e.g., of both the interior and exterior of nozzle 544, by exerting forces directly on the outer surface 553 of nozzle 544 in response to the electrical signals from controller 290. That is, the size and/or shape may be adjusted based on the wind speed.

For example, the size and/or shape of the flow passage 570 between the outer surface 553 of nozzle 544 and the inner surface 147 of nozzle 144 may be adjusted by adjusting the size and/or shape of nozzle 544 using the actuators 286 coupled to nozzle 544 and/or by adjusting the size and/or shape (e.g., the amount of convergence) of nozzle 144 using the actuators 286 coupled to nozzle 144. That is, the actuators 286 coupled to nozzle 544 adjust the size and/or shape of nozzle 544 in response to receiving electrical signals from controller 290 and/or the actuators 286 coupled to nozzle 144 adjust the size and/or shape of nozzle 144 in response to receiving electrical signals from controller 290. For example, the size and/or shape of nozzle 144 and/or nozzle 544 may be adjusted based on wind speed.

In addition, the turning radius (e.g., the radius of curvature) of the flow passage 570 may be adjusted by adjusting the actuators 286 coupled to nozzle 544 and/or nozzle 144. The actuators 286 coupled to nozzle 544 may also be used to adjust the size and/or shape (e.g., the amount of convergence) of the flow passage 562 in nozzle 544. In other words, the size and/or shape of flow passage 562 may be adjusted by the actuators 286 coupled to nozzle 544 in response to these actuators receiving electrical signals from controller 290 and/or the size and/or shape of flow passage 570 may be adjusted by the actuators 286 coupled to nozzle 144 and/or nozzle 544 in response to these actuators receiving electrical signals from controller 290.

Controller 290 may store voltage values corresponding to the voltages that might be applied to the actuators 286 coupled to nozzle 144 and/or to the actuators 286 coupled to nozzle 544 to set the size and/or shape (e.g., the amount of convergence) of the flow passage 570 and/or the size and/or shape (e.g., the amount of convergence) of flow passage 562 that provides a certain increase in velocity and/or reduced losses for a certain wind velocity for a certain power output.

For example, anemometer 292 might detect a wind speed and send a signal indicative of the wind speed to controller 290. Controller 290 may determine how much voltage might be applied to the actuators 286 to set the size and/or shape of the flow passage 570 and/or flow passage 562 in order to produce a particular velocity at outlet 142 or at the outlet of duct 170 for the detected wind speed.

Figure 7:
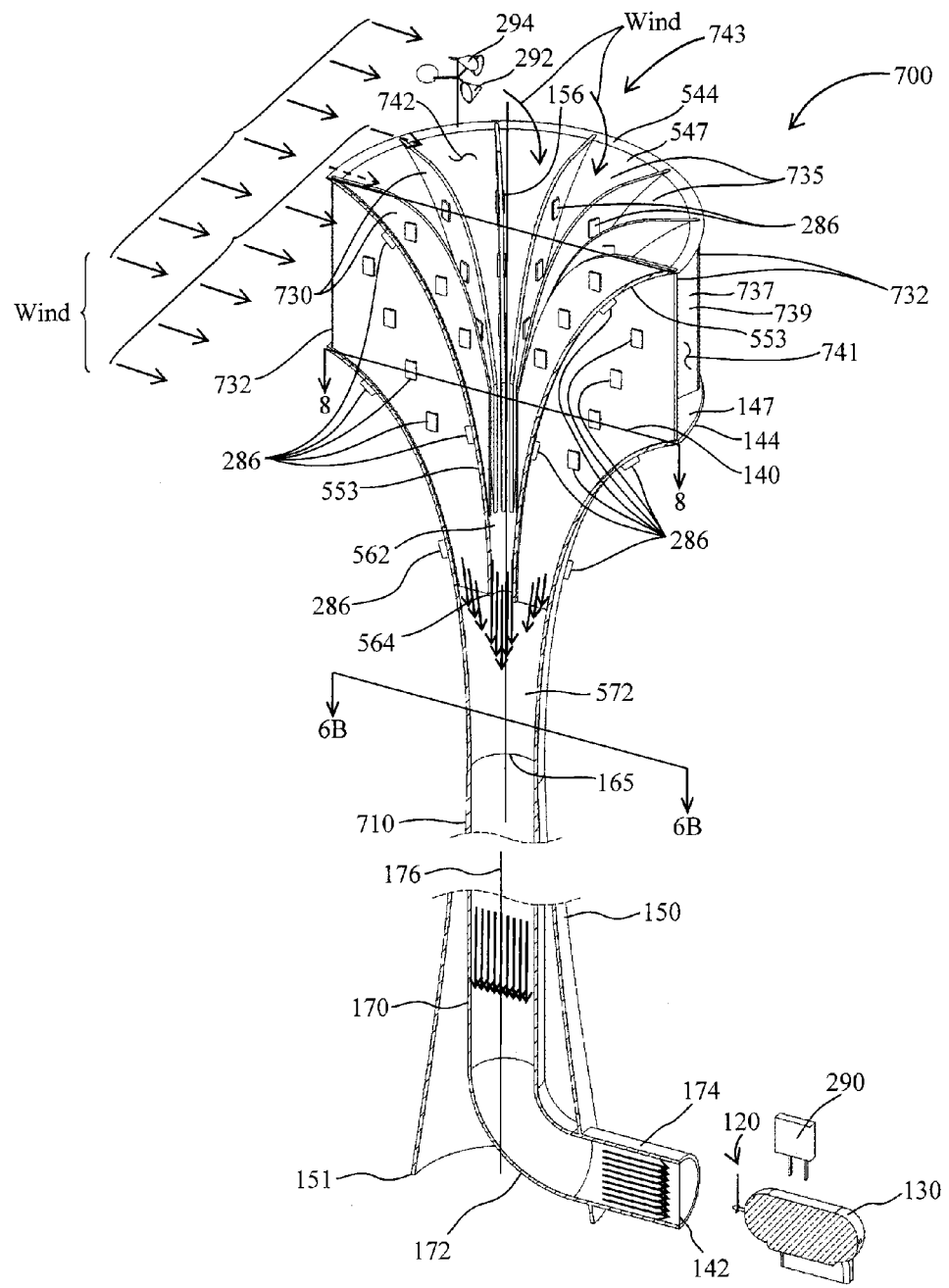
FIG. 7 is a cut-away perspective view of another embodiment of a wind-energy conversion system.

FIG. 7 is a cut-away perspective view of a wind-energy conversion system 700 having a turbine-intake tower 710 with an intake assembly 743 located at the top of support column 150, and thus turbine-intake tower 710. Common numbering is used in FIGS. 1, 5, and 7 to identify components common to FIGS. 1, 5, and 7. The common components may be as discussed above in conjunction with FIGS. 1 and 5.

Figure 8:
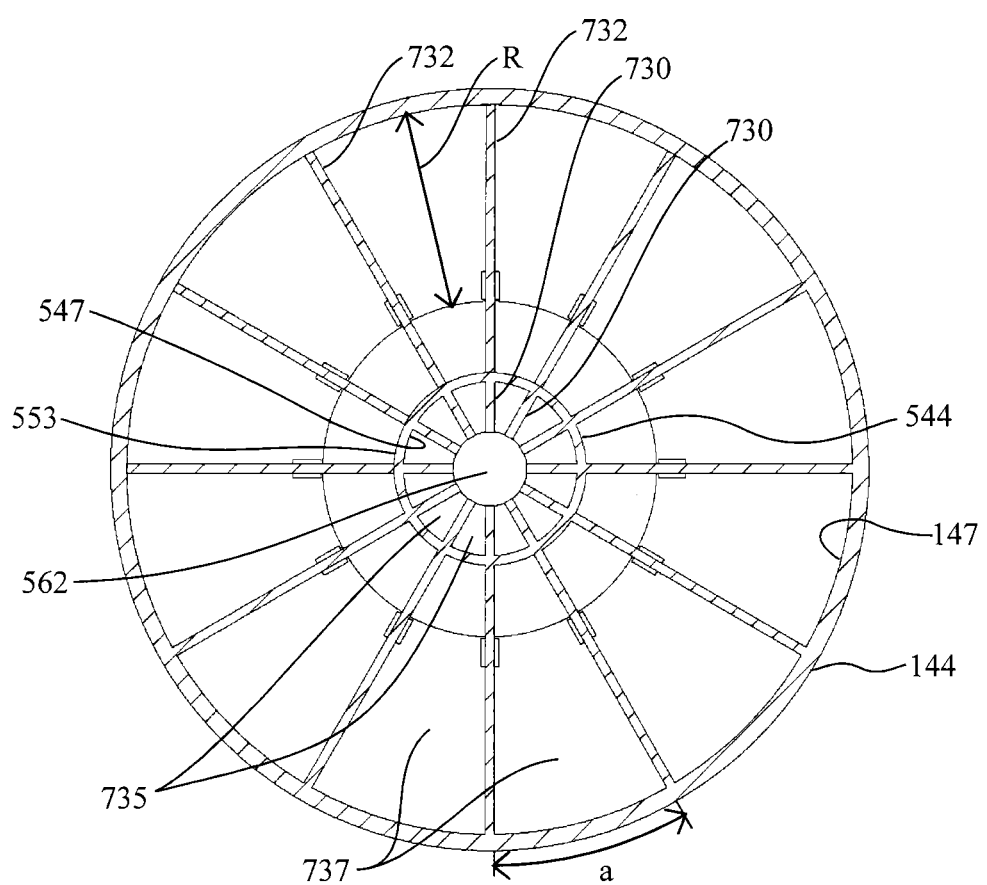
FIG. 8 is a cross-section viewed along line 8-8 in FIG. 7.

Wind-energy conversion system 700 may be substantially the same as energy conversion system 500 in FIG. 5, except that vanes 730 may extend into the interior of nozzle 544 from inner surface 547 of nozzle 544, and/or vanes 732 may extend into the interior of nozzle 144 from inner surface 147 of nozzle 144, as shown in FIG. 7 and FIG. 8, a cross-section viewed along line 8-8 in FIG. 7, where line 8-8 is coincident with the inlet 140 of nozzle 144. For example, vanes 730 may extend substantially radially (e.g., radially) into the interior of nozzle 544 from inner surface 547 of nozzle 544, and/or vanes 732 may extend substantially radially (e.g., radially) into the interior of nozzle 144 from inner surface 147 of nozzle 144. Each of vanes 732 may have substantially the same shape as the cross-section of flow passage 570 in FIG. 5, as can be seen by comparing FIGS. 5 and 7.

For some embodiments, nozzle 144 with vanes 732 and nozzle 544 with vanes 730 may form intake assembly 743. For example, intake assembly 743 may include vanes 730 extending into nozzle 544 and/or vanes 732 extending into nozzle 144.

Vanes 730 may be distributed around the perimeter (e.g., circumference) of inner surface 547 to produce (e.g., define) a plurality flow passages 735, where each flow passage 735 is between successively adjacent vanes 730, as shown in FIGS. 7 and 8. For example, vanes 730 may divide flow passage 562 (FIG. 5) of nozzle 544 into a plurality of flow passages 735 so that there is a plurality of flow passages 735 within nozzle 544. Flow passages 735 may be spaced around the entire perimeter of inner surface 547 nozzle 544.

Each flow passage 735 may converge (e.g., taper) in the vertically downward direction, e.g., the downward direction along the direction of central longitudinal axis 156, away from the top of nozzle 544. For example, the angular (e.g., circumferential) distance a (FIG. 8) between successively adjacent vanes 730 decreases with increasing vertical downward distance into nozzle 544 from the top of nozzle 544.

Vanes 732 may be distributed around the entire perimeter (e.g., circumference) of inner surface 147 of nozzle 144 to produce (e.g., define) a plurality individual flow passages 737, where each flow passage 737 is between successively adjacent vanes 732, as shown in FIGS. 7 and 8. Vanes 732 may divide flow passage 570 in FIG. 5 into a plurality of individual flow passages 737. Therefore, there is a plurality of flow passages 737 within nozzle 144. Flow passages 737 may be spaced around the entire perimeter of inner surface 147 nozzle 144.

Each flow passage 737 may converge with increasing distance into that flow passage 737 from an inlet 739, and thus an inlet plane 741, of that flow passage 737. For example, the angular distance a between successively adjacent vanes 732 may decrease with increasing downward vertical distance into nozzle 144 from the top of nozzle 144. The radial distance R (FIG. 8) of each flow passage 737 between exterior surface 553 of nozzle 544 and interior surface 147 of nozzle 144 may decrease with increasing distance into that flow passage from the inlet 739 of that flow passage 737, e.g., with increasing downward vertical distance into nozzle 144 from the inlet 140 of nozzle 144.

Inlets 739 of flow passages 737 may be substantially vertical (e.g., vertical). Vanes 732 may divide opening 560 and plane 565 of opening 560 in FIG. 5 into a plurality of individual inlets 739 and corresponding inlet planes 741, where each inlet 739 and each inlet plane 741 are respectively an inlet and an inlet plane of a respective one of individual flow passages 737. Each vane 732 may be viewed as extending across the opening 560 around the circumference of intake assembly 543 in FIG. 5. Vanes 732 divide opening 560 of intake assembly 543 into the individual inlets 739 of intake assembly 743.

Inlets 739 are inlets to the intake assembly 743, meaning that for some embodiments, intake assembly 743 has a plurality of substantially vertical (e.g., vertical) discrete inlets 739 distributed around the entire perimeter (e.g., circumference) of intake assembly 743. The inlet 540 of nozzle 544 (shown in FIG. 5) may be another inlet to intake assembly 743. Inlet 540 may be respectively divided into inlets 742 to the flow passages 735 by vanes 730. Inlets 742 and inlets 739 allow wind to enter intake assembly 743 from substantially any prevailing wind direction. For example, wind may enter intake assembly 743 at substantially 360 degrees (e.g., at 360 degrees) around intake assembly 743. This avoids the need for turning an inlet of a wind-energy conversion system or a turbine of a wind-energy conversion system into the wind, e.g., thereby eliminating a need for yaw system.

Each flow passage 737 may pass through inlet 140 of nozzle 144. At inlet 140 of nozzle 144, each flow passage 737 may become an angular segment of an annulus between exterior surface 553 of nozzle 544 and inner surface 147 of nozzle 144, as shown in FIG. 8. Each flow passage 737 may terminate within nozzle 144, e.g., adjacent to where nozzle 544 terminates and adjacent to where the outlet 564 of nozzle 544 is located. Each flow passage 737 may transition, where it terminates, within nozzle 144, to the flow passage 572, e.g., having a circular cross-section, within nozzle 144 and extending from outlet 564 of nozzle 544 to outlet 165 of nozzle 144, as shown in FIG. 7 and FIG. 6B.

Vanes 730 may terminate within nozzle 544 before, e.g., at a vertical distance above, outlet 564 of nozzle 544, and converging flow passage 562 of nozzle 544 may extend from where vanes 730 terminate to outlet 564 of nozzle 544. Flow passage 562 of nozzle 544 opens into flow passage 572 of nozzle 144 at outlet 564 of nozzle 544. Nozzle 144, and thus flow passage 572, may continue to converge (e.g., taper) from outlet 564 of nozzle 544 to outlet 165 of nozzle 144.

During operation, each flow passage 735 of nozzle 544 receives and accelerates the wind. For embodiments where vanes 730 terminate before outlet 564 of nozzle 544, the wind exits each flow passage 735. The flows exiting flow passages 735 combine with each other to produce a substantially single flow that continues to converge and accelerate from where vanes 730 terminate to outlet 564 through converging flow passage 562 of nozzle 544. The accelerated wind exits flow passage 562 at the outlet 564 of nozzle 544 and is received in flow passage 572 of nozzle 144.

Wind is also received at the inlet 739 of each flow passage 737. For example, the exterior surface 553 of nozzle 544 may deflect the wind into each flow passage 737 so that the wind flows through each flow passage 737. As the wind flows from an inlet 739 through a respective flow passage 737, it converges and thus accelerates. The accelerated wind exits each flow passage 737 where nozzle 544 terminates within nozzle 144, e.g., adjacent to outlet 564 of nozzle 544, and is received in flow passage 572.

As the accelerating wind flows through each flow passage 737, it may be turned by the curvature of the respective flow passage 737, e.g., toward the vertical downward direction. The wind flowing in each flow passage 737 may have a cross-section that is substantially an angular segment of an annulus in the region between inlet 140 of nozzle 144 and where the wind exits the respective flow passage 737 adjacent to the outlet 564 of nozzle 544. After exiting flow passages 737 adjacent to the outlet 564 of nozzle 544, the wind from each flow passage 737 is received in flow passage 572 of nozzle 144 and combines (e.g., merges) in flow passage 572 with the wind that is received in flow passage 572 from outlet 564 of nozzle 544, producing a substantially single flow of wind in flow passage 572 from the combined flows.

As the substantially single flow of wind flows through flow passage 572, it converges and thus accelerates. For some embodiments, the accelerating wind flowing through flow passage 572 may be substantially vertically downward. Duct 170 receives the accelerated, substantially vertical wind flow, e.g., with a substantially circular cross-section, from flow passage 572. After the wind is received by duct 170, the wind may proceed to turbine 120, as described above in conjunction with FIG. 1.

For some embodiments, actuators 286 may be coupled to, e.g., in direct physical contact with, the surfaces of one or more of vanes 730 and/or the surfaces of one or more of vanes 732, as shown in FIG. 7, and may be electrically coupled to controller 290 for receiving electrical signals from controller 290. In response to receiving signals indicative of the wind speed from anemometer 292, controller 290 may send electrical signals to the actuators 286 coupled to one or more of vanes 730, to the actuators 286 coupled to one or more vanes 732, to the actuators 286 coupled to nozzle 144, and/or to the actuators 286 coupled to nozzle 544. In other words, one or more actuators 286 are coupled to at least one of nozzle 144, nozzle 544, and the vanes extending into an interior of at least one of nozzle 144 and nozzle 544.

As indicated above in conjunction with FIG. 5, the actuators 286 coupled to nozzle 544 may adjust the size and/or shape, e.g., of both the interior and exterior of nozzle 544 by exerting forces directly on the outer surface 553 of nozzle 544 in response to receiving electrical signals from controller 290. That is, the size and/or shape of nozzle 544 may be adjusted based on the wind speed.

The size and/or shape (e.g., the amount of convergence) of each flow passage 735 between successively adjacent vanes 730 may be adjusted using the actuators 286 coupled to successively adjacent vanes 730 in response to these actuators 286 receiving electrical signals from controller 290. The size and/or shape (e.g., the amount of convergence) of each flow passage 737 between successively adjacent vanes 732 may be adjusted using the actuators 286 coupled to successively adjacent vanes 732 in response to these actuators 286 receiving electrical signals from controller 290.

For some embodiments, the size and/or shape of each flow passage 735 between successively adjacent vanes 730 may be adjusted using the actuators 286 coupled to successively adjacent vanes 730 in conjunction with adjusting the size and/or shape of nozzles 144 and/or nozzles 544. The size and/or shape of each flow passage 737 between successively adjacent vanes 732 may be adjusted using the actuators 286 coupled to successively adjacent vanes 732 in conjunction with adjusting the size and/or shape of nozzle 144, the size and/or shape of nozzle 544, and/or the size and/or shape of each flow passage 735.

Controller 290 may store voltage values corresponding to the voltages that might be applied to the actuators 286 to set the size and/or shape of each of the flow passages 735, the size and/or shape of each of the flow passages 737, the size and/or shape of nozzle 144, and/or the size and/or shape of nozzle 544 that provides a certain increase in velocity and/or reduced losses for a certain wind velocity for a certain power output. For example, anemometer 292 might detect a wind speed and send a signal indicative of the wind speed to controller 290. Controller 290 may determine how much voltage might be applied to the actuators 286 to set the size and/or shape of each of the flow passages 735, the size and/or shape of each of the flow passages 737, the size and/or shape of nozzle 144, and/or the size and/or shape of nozzle 544 in order to produce a particular velocity at outlet 142 or at the outlet of duct 170 for the detected wind speed.

Figure 9:
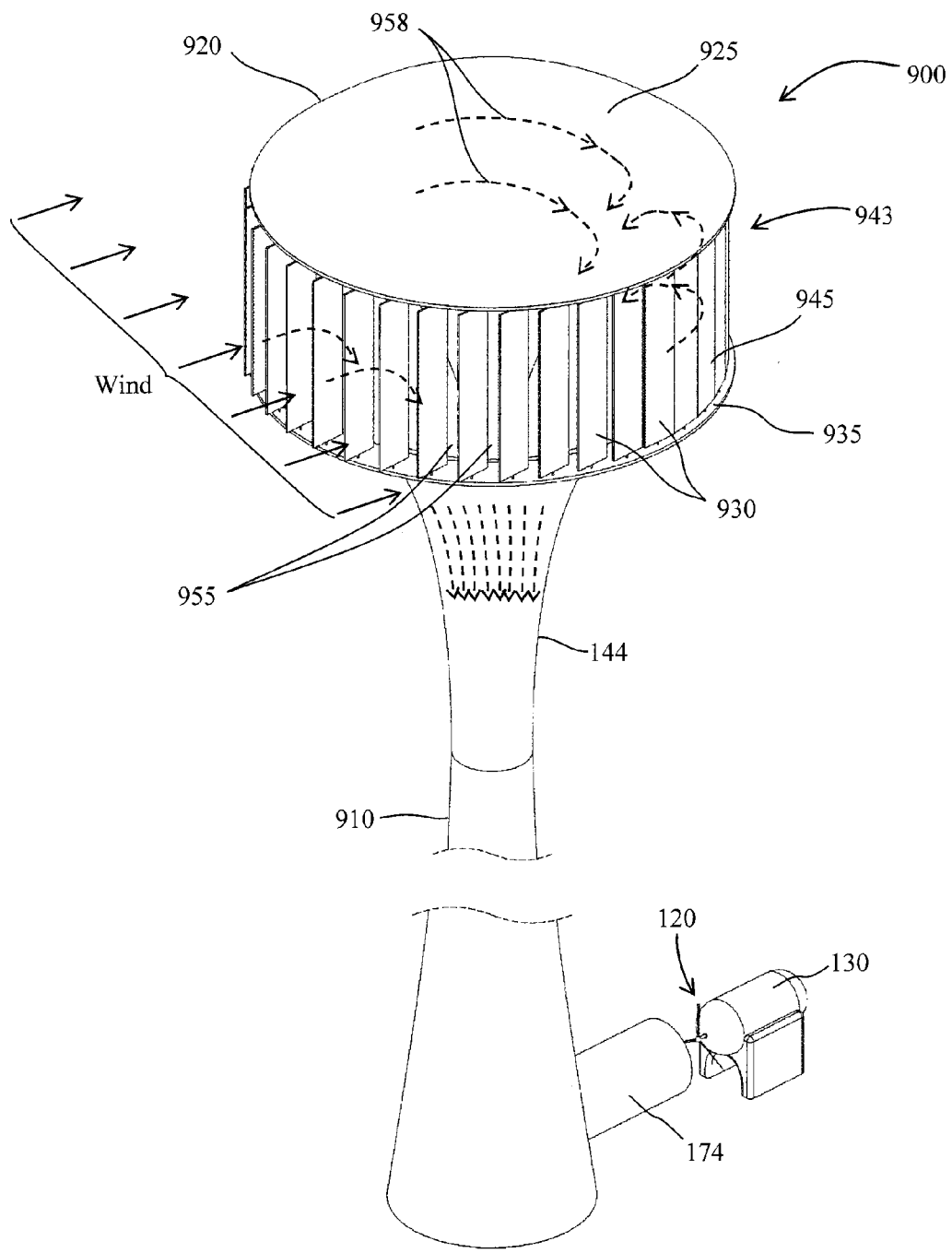
FIG. 9 is a perspective view of another embodiment of a wind-energy conversion system.
Figure 10:
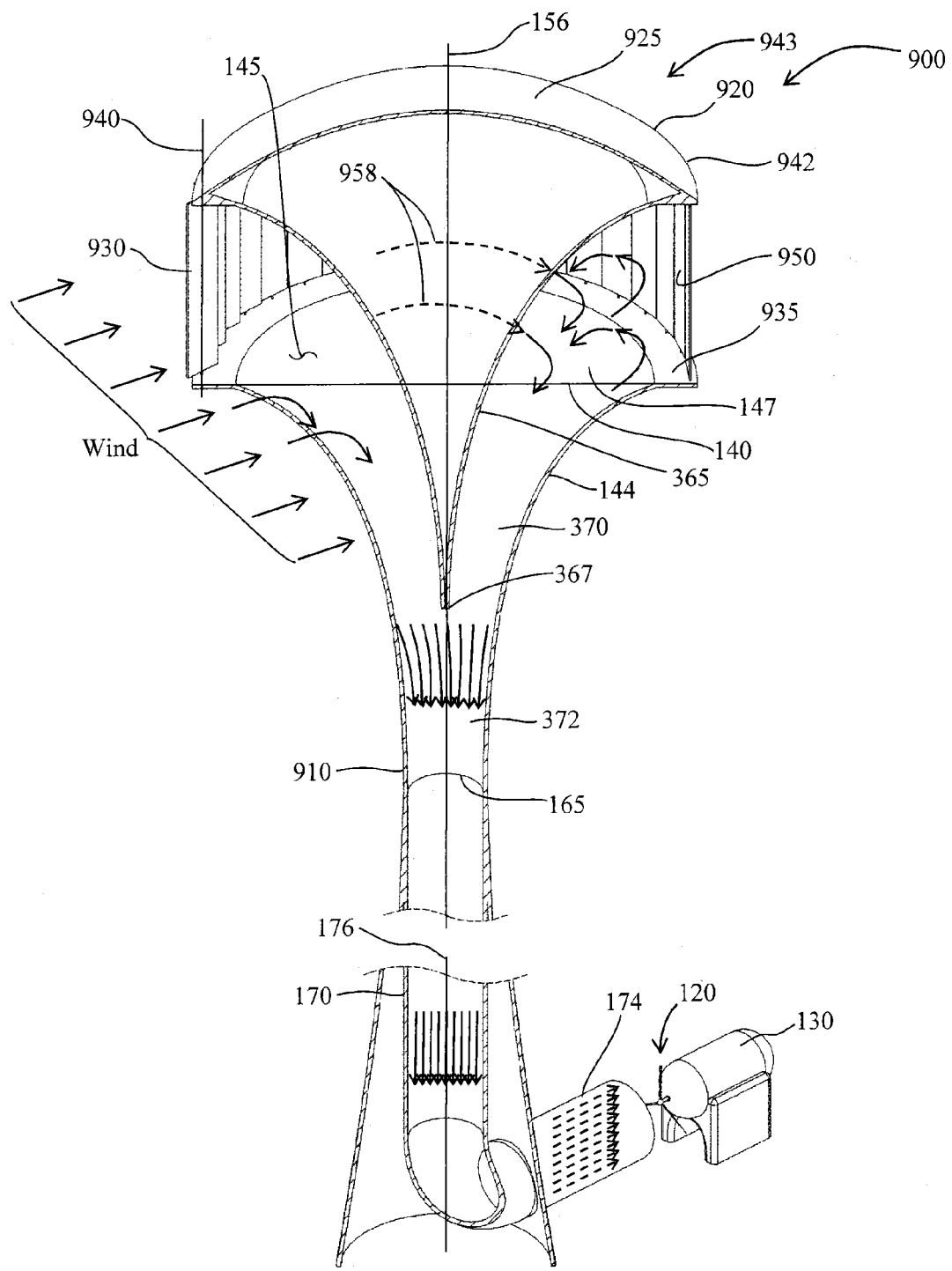
FIG. 10 is a cut-away perspective view of the wind-energy conversion system in FIG. 9.

FIGS. 9-10 illustrate a wind-energy conversion system 900 having a turbine-intake tower 910 with an intake assembly 943 at the top of turbine-intake tower 910. FIG. 9 is a perspective view of wind-energy conversion system 900, and FIG. 10 is a cut-away perspective view of wind-energy conversion system 900. Common numbering is used in FIG. 3 and FIGS. 9-10 to identify components common to FIG. 3 and FIGS. 9-10. The common components may be as discussed above in conjunction with FIG. 3.

For some embodiments, turbine-intake tower 910 may be substantially the same as (e.g., the same as) turbine-intake tower 310, described above in conjunction with FIG. 3, except that a plurality of shutters 930 of an enclosure 920 may replace vanes 330 so that intake assembly 943 includes enclosure 920, and thus shutters 930, nozzle 144, and deflector 365. For example, enclosure 920 may cover an inlet to flow passage 370 that is adjacent to an outer edge of nozzle 144. That is, enclosure 920 may cover deflector 365 and the inlet 140 to nozzle 144.

Each shutter 930 may be between a cover 925 of enclosure 920 and an upper portion of nozzle 144. Each shutter 930 may be pivotally coupled to cover 925 of enclosure 920 and the upper portion of nozzle 144. For example, each shutter 930 may be pivotally coupled to cover 925 and to a flange 935, that may extend from nozzle 144, so that the respective shutter 930 can pivot about a substantially vertical (e.g., a vertical) pivot axis) 940, e.g., that may be substantially parallel to (e.g., parallel to) central longitudinal axis 156 of nozzle 144.

Deflector 365 may extend downward into the interior of nozzle 144 from cover 925. For example, deflector 365 converges (tapers) inwardly from a sidewall of enclosure 920 to substantially a point at central longitudinal axis 156 of nozzle 144, as indicated by reference number 367.

When shutters 930 are closed they form the sidewall of enclosure 920 and thus of intake assembly 943. An exterior surface 945 of each shutter 930 may form a portion of an exterior surface of the sidewall of enclosure 920. An interior surface 950 of each shutter 930 may form a portion of an interior surface of the sidewall of enclosure 920.

Each shutter 930 may open, e.g., by pivoting about its pivot axis 940, in response to receiving wind at (e.g., against) its exterior surface 945. Opening shutters 930 produces substantially vertical (e.g., vertical) openings 955 between successively adjacent open shutters 930, as shown in FIG. 9, in the sidewall of enclosure 920. The wind may enter the interior of enclosure 920 through openings 955.

Shutters 930 may be configured so that a portion of the shutters 930 remain closed when the wind that enters the interior of enclosure 920 through open shutters 930 flows against the interior surfaces 950 of the closed shutters 930. For some embodiments, shutters 930 may be biased in a closed position, e.g., by a torsional spring or the like, and may be opened in response to receiving wind against the exterior surface 945 thereof.

The interior of enclosure 920 is a portion of the interior of intake assembly 943, meaning that the openings 955 between successively adjacent open shutters 930 are openings to intake assembly 943. Enclosure 920 and its shutters 930 allow the wind to enter intake assembly 943 from substantially any prevailing wind direction. For example, wind may enter intake assembly 943 at substantially 360 degrees (e.g., at 360 degrees) around intake assembly 943. This avoids the need for turning an inlet of a wind-energy conversion system or a turbine of a wind-energy conversion system into the wind, e.g., thereby eliminating a need for a yaw system.

During operation, a portion of shutters 930, e.g., the shutters 930 whose outer surfaces 945 are facing the wind, open (e.g. pivot open) in response to the wind flowing against the outer surfaces 945 of those shutters 930. However, the shutters 920 whose exterior surfaces 945 face away from the wind remain closed. For example, this allows enclosure 920 to trap substantially all of the wind that enters enclosure 920.

After entering enclosure 920, a portion of the wind may flow directly into deflector 365 and may be deflected into flow passage 370, as described above in conjunction with FIG. 3 and as shown in FIG. 10. Another portion of the wind may flow past deflector 365 and may flow against the interior surfaces 950 of the closed shutters 930. The closed shutters 930 may then direct (e.g., deflect) that portion of the wind into flow passage 370. That is, a portion of the wind may flow around the interior perimeter (e.g., circumference) of enclosure 920 before entering flow passage 370. For example, a portion of the wind directed into flow passage 370 by the closed shutters 930 may flow substantially circumferentially (e.g., circumferentially) around the interior circumference of enclosure 920 before entering flow passage 370, as indicated by dashed lines 958 in FIGS. 9 and 10.

The wind flows through flow passage 370 and into duct 170, as described above in conjunction with FIG. 3. After the wind is received by duct 170, the wind may proceed to turbine 120, as described above in conjunction with FIG. 1. Note that the wind may be further accelerated by the converging flow passage 372 of nozzle 144 that extends substantially vertically below (e.g., vertically below) deflector 365 before entering duct 170, as discussed above in conjunction with FIG. 3.

Figure 11:
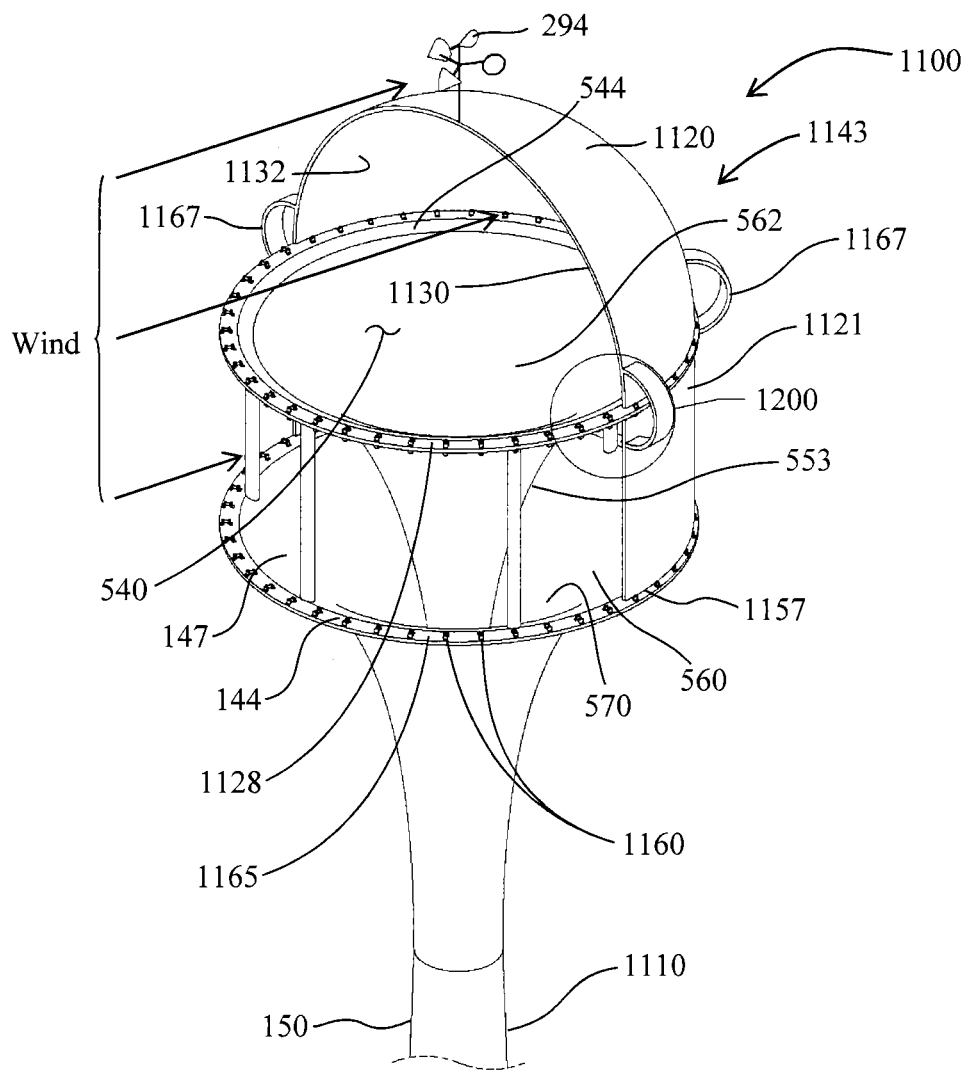
FIG. 11 is a perspective view of another embodiment of a wind-energy conversion system.
Figure 11:
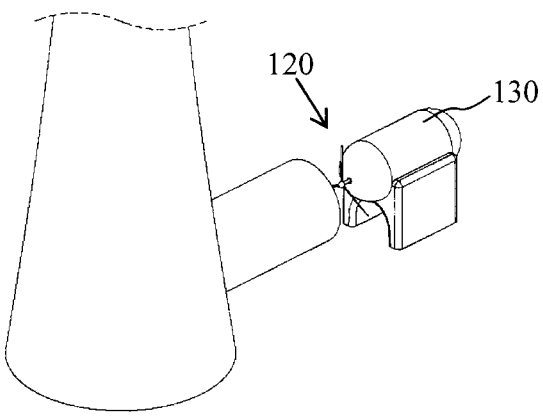
Figure 12:
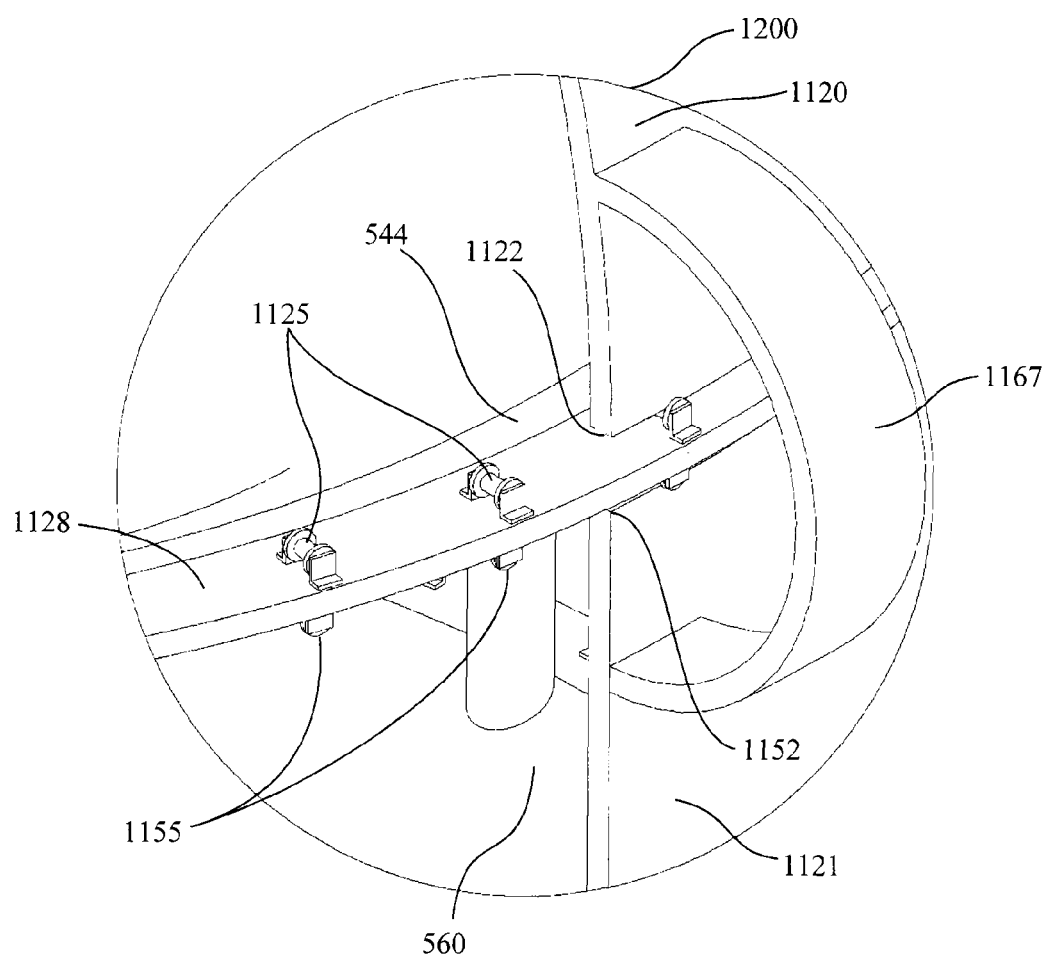
FIG. 12 is an enlarged view of the region 1200 in FIG. 11.

FIGS. 11-12 illustrate a wind-energy conversion system 1100 having a turbine-intake tower 1110 with an intake assembly 1143 at the top of turbine-intake tower 1110. FIG. 11 is a perspective view of wind-energy conversion system 1100, and FIG. 12 is an enlarged view of the region 1200 in FIG. 11. Common numbering is used in FIG. 5 and FIGS. 11-12 to identify components common to FIG. 5 and FIGS. 11-12. The common components may be as discussed above in conjunction with FIG. 5.

For some embodiments, intake assembly 1143 of turbine-intake tower 1110 may be substantially the same as (e.g., the same as) the intake assembly 543 of turbine-intake tower 510, described above in conjunction with FIG. 5, except that a scoop 1120 may be movably (e.g., rotatably) coupled to nozzle 544, and/or a scoop 1121 may be between and movably (e.g., rotatably) coupled to nozzles 144 and 544. For example, at least one of scoop 1120 and scoop 1121 may be added to the intake assembly 543 of FIG. 5 to form the intake assembly 1143 of turbine-intake tower 1110. In other words, for some embodiments, scoop 1120 may be movably coupled to nozzle 544 adjacent to inlet 540 of nozzle 544, and/or scoop 1121 may be between and movably coupled to nozzles 144 and 544. For example, scoop 1120 may be adjacent to an outermost edge of nozzle 544, and/or scoop 1121 may be adjacent to the outermost edge of nozzle 544 and an outermost edge of nozzle 144.

A bottom edge 1122 of scoop 1120 may move over (e.g., ride on) rollers 1125, e.g., circumferentially distributed around an upper surface of a flange 1128 that may extend from nozzle 544. For example, rollers 1125 may define a circumferential path, e.g., adjacent to the outermost edge of nozzle 544 and adjacent to the inlet 540 of nozzle 544, about which scoop 1120 travels. In other words, scoop 1120 is confined to travel about that path.

Scoop 1120 may cover a portion of the inlet 540 to nozzle 544. For some embodiments, scoop 1120 may be a portion of a substantially spherical shell.

Scoop 1121 may cover a portion of inlet 560 that extends around the perimeter (e.g., circumference) of intake assembly 1143. Note that as described above in conjunction with FIG. 5, inlet 560 is the inlet to the flow passage 570 between inner surface 147 of nozzle 144 and exterior surface 553 of nozzle 544. For some embodiments, scoop 1121 may be a portion of a substantially cylindrical shell.

A top edge 1152 of scoop 1121 may ride on rollers 1155, e.g., circumferentially distributed around a lower surface of flange 1128. A bottom edge 1157 of scoop 1121 may ride on rollers 1160, e.g., circumferentially distributed around an upper surface of a flange 1165 that may extend from nozzle 144. For example, rollers 1155 may define a circumferential path, e.g., adjacent to the outermost edge of nozzle 544, and rollers 1160 may define a circumferential path, e.g., adjacent to the outermost edge of nozzle 144, where scoop 1121 is confined to travel about these paths.

Wind vane 294 may be coupled to an outer surface of scoop 1120. Wind vane 294 catches the wind and rotates scoop 1120 relative to nozzles 144 and 544 so that an inlet 1130 of scoop 1120 is directed (e.g., faces) into the wind. For some embodiments, scoop 1120 may be coupled to scoop 1121 by one or more couplers 1167 so that when wind vane 294 rotates scoop 1120, scoop 1121 rotates concurrently with scoop 1120 relative to nozzles 144 and 544, and an interior surface (e.g., a concave interior surface) of scoop 1121 is directed (e.g., faces) into the wind.

During operation, the wind received at wind vane 294 causes wind vane 294 to rotate scoop 1120 so that inlet 1130 of scoop 1120 faces into the wind. Rotating scoop 1120 may also rotate scoop 1121 concurrently with scoop 1120 so that the interior surface of scoop 1121 faces into the wind. The wind then flows through inlet 1130 of scoop 1120 and is deflected by an interior surface 1132 of scoop 1120 into converging flow passage 562 of nozzle 544.

The wind may also enter inlet 560. A portion of the wind entering through inlet 560 may be deflected into flow passage 570 by exterior surface 553 of nozzle 544. Another portion of the wind entering through inlet 560 may flow past exterior surface 553 and may flow against the interior surface of scoop 1121. The interior surface of scoop 1121 may then direct (e.g., deflect) that portion of the wind into flow passage 570.

The wind then flows through flow passages 562 and 570 and into duct 170, as shown in FIG. 5 and as described above in conjunction with FIG. 5. After the wind is received by duct 170, the wind may proceed to turbine 120, as described above in conjunction with FIG. 1. Note that the wind may be further accelerated by the converging flow passage 572 of nozzle 144 (FIG. 5) that extends substantially vertically below (e.g., vertically below) outlet 564 of nozzle 544 before entering duct 170, as discussed above in conjunction with FIG. 5.

Figure 13:
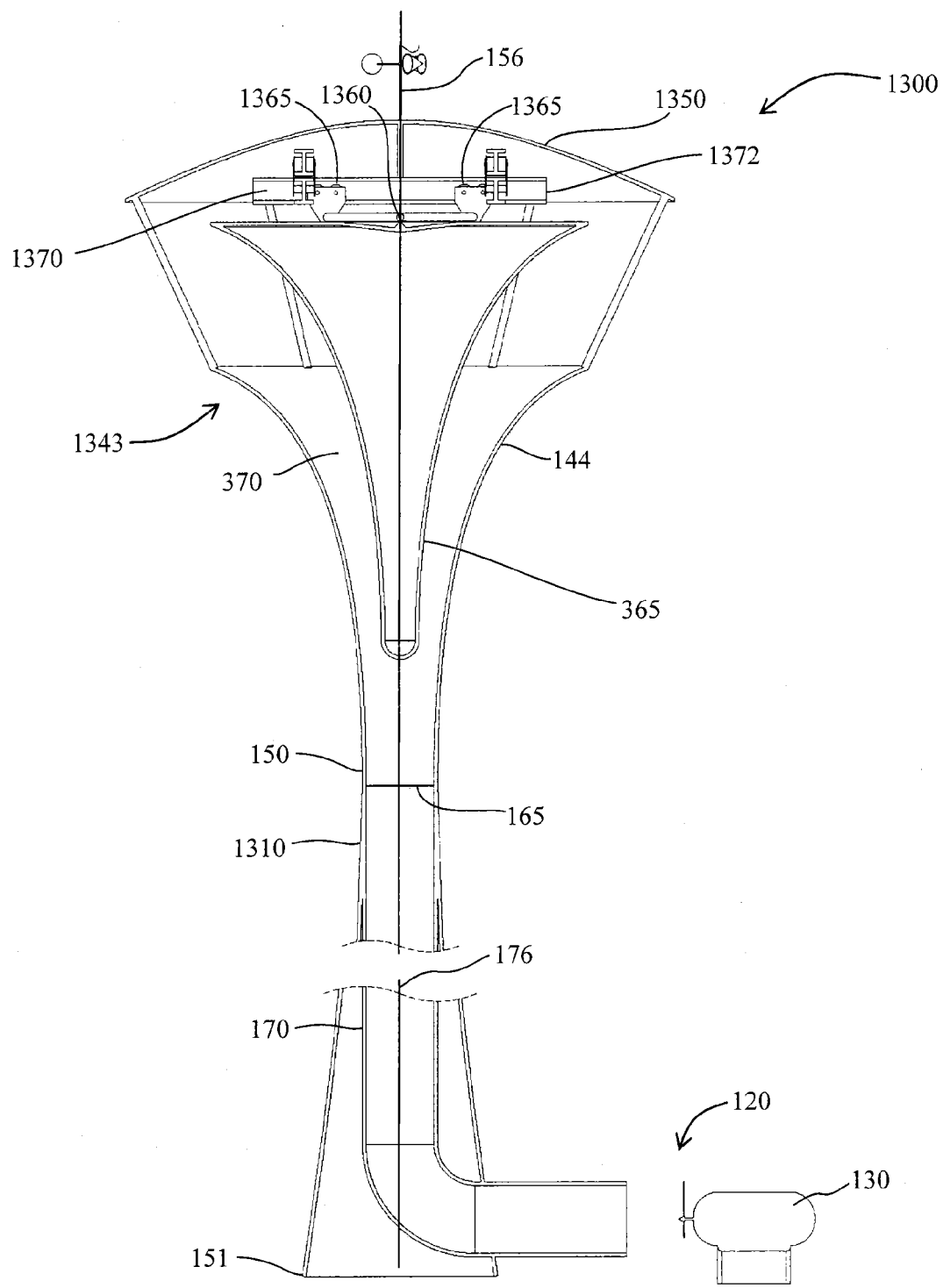
FIG. 13 is a cross-sectional view of another embodiment of a wind-energy conversion system having a movable object extending into a nozzle.

FIG. 13 is a cross-sectional view (cross-hatching omitted for clarity) of a wind-energy conversion system 1300 having a turbine-intake tower 1310 with an intake assembly 1343 at the top of turbine-intake tower 1310. Common numbering is used in FIG. 3 and FIG. 13 to identify components common to FIG. 3 and FIG. 13. The common components may be as discussed above in conjunction with FIG. 3.

For some embodiments, intake assembly 1343 of turbine-intake tower 1310 may be substantially the same as (e.g., the same as) the intake assembly 343 of turbine-intake tower 310, described above in conjunction with FIG. 3, except that the object (e.g., the deflector 365) that extends into nozzle 144 is movable in response to the wind flowing against (e.g., the wind being received at) deflector 365. That is, deflector 365 may be configured to move within nozzle 144. For example, deflector 365 may be movably coupled within (e.g., to a cover 1350 of) intake assembly 1343. Note that intake assembly 1343 may include nozzle 144 and the movable deflector 356.

For some embodiments, deflector 365 may be pivotally coupled within intake assembly 1343, e.g., to cover 1350. For example, a ball 1360 may be attached to an upper surface of deflector 365 substantially at the center of (e.g., at the center of) deflector 365. Ball 1360 may be movably (e.g., slidably) coupled within a socket (not shown) that may be coupled within intake assembly 1343, e.g., to cover 1350, substantially at the center of (e.g., at the center of) intake assembly 1343, e.g., cover 1350, to form a ball-and-socket joint. Deflector 365 may pivot about substantially a point, e.g., ball 1360, in response to the wind blowing against deflector 365.

For other embodiments, the socket may be movably (e.g., rollably) coupled within intake assembly 1343. The socket may be coupled to rollers 1365 that may move (e.g., ride) within a channel 1370, such as a track, formed in intake assembly 1343.

For some embodiments, the channel 1370 may be in an object 1372 that may be pivotally coupled within intake assembly 1343, e.g., to cover 1350, for pivoting about central longitudinal axis 156 of nozzle 144. As such, channel 1370 can pivot about central longitudinal axis 156. Allowing channel 1370 to pivot acts to orient channel 1370 in a direction substantially parallel (e.g., parallel) to the direction of the wind in response to the wind being received at (blowing against deflector 365). Note object 1372 and channel 1370 can pivot about central longitudinal axis 156 to be aligned with substantially any diameter of nozzle 144. For example, object 1372 and channel 1370 may be configured to by 360 degrees about central longitudinal axis 156.

The socket may then move (e.g., by translation) in the direction of channel 1370, which is substantially parallel (e.g., parallel) to the direction of the wind in response to the wind blowing against deflector 365. For example, the socket moves as rollers 1365 move in channel 1370. As such, channel 1370 guides rollers, and thus the socket, along a path that is substantially parallel (e.g., parallel) to the direction of the wind.

Figure 14:
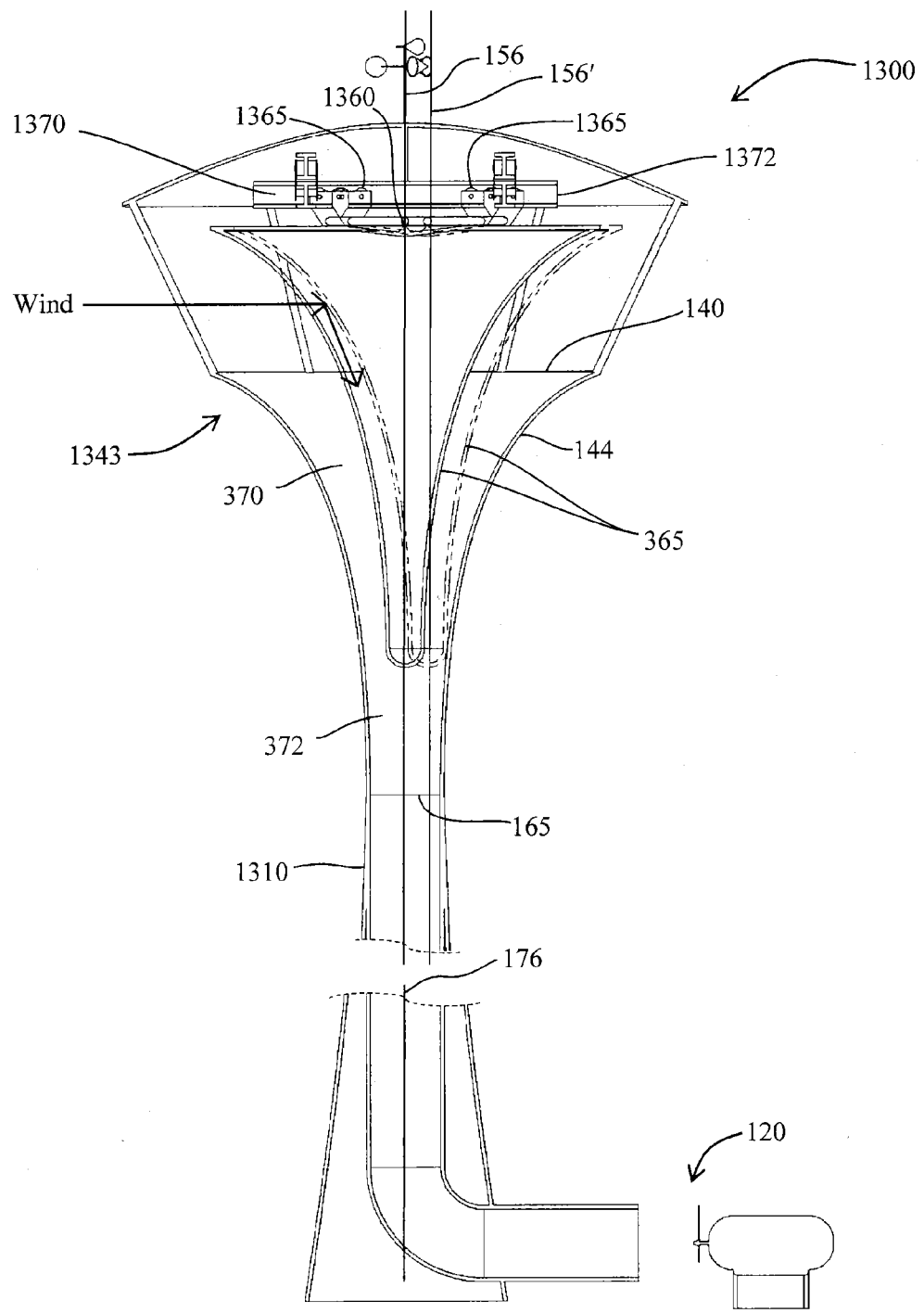
FIG. 14 is a cross-sectional view illustrating an object moving by translation within a wind-energy conversion system, according to an embodiment.

FIG. 14 is a cross-sectional view (cross-hatching omitted for clarity) showing deflector 365 moving by translation within intake assembly 1343 in response to the wind flowing against deflector 365. For example, the socket moves (e.g., translates) along the direction of channel 1370 after channel 1370 has pivoted to a direction substantially parallel to the wind. Note that the central longitudinal axis 156' of deflector 365 is displaced from the central longitudinal axis 156 of nozzle 144, and is thus no longer coincident (e.g., collinear) with the central longitudinal axis 156 of nozzle 144, as a result of the translation. However, the central longitudinal axis 156' of deflector 365 may remain substantially parallel to (e.g., parallel to) the central longitudinal axis 156 of nozzle 144 as a result of the translation. The translation causes a portion of the flow passage 370 to be larger on the side of intake assembly 1343 facing the wind, allowing more of the wind to flow into that portion of flow passage 370 than would otherwise occur if deflector 365 was not able to move in response to the wind.

The wind is deflected by deflector 365 into flow passage 370 and subsequently flows through flow passage 370 and into duct 170, as described above in conjunction with FIG. 3. After the wind is received by duct 170, the wind may proceed to turbine 120 as described above in conjunction with FIG. 1. Note that the wind may be further accelerated by the converging flow passage 372 of nozzle 144 that extends substantially vertically below (e.g., vertically below) deflector 365 before entering duct 170, as discussed above in conjunction with FIG. 3.

Figure 15:
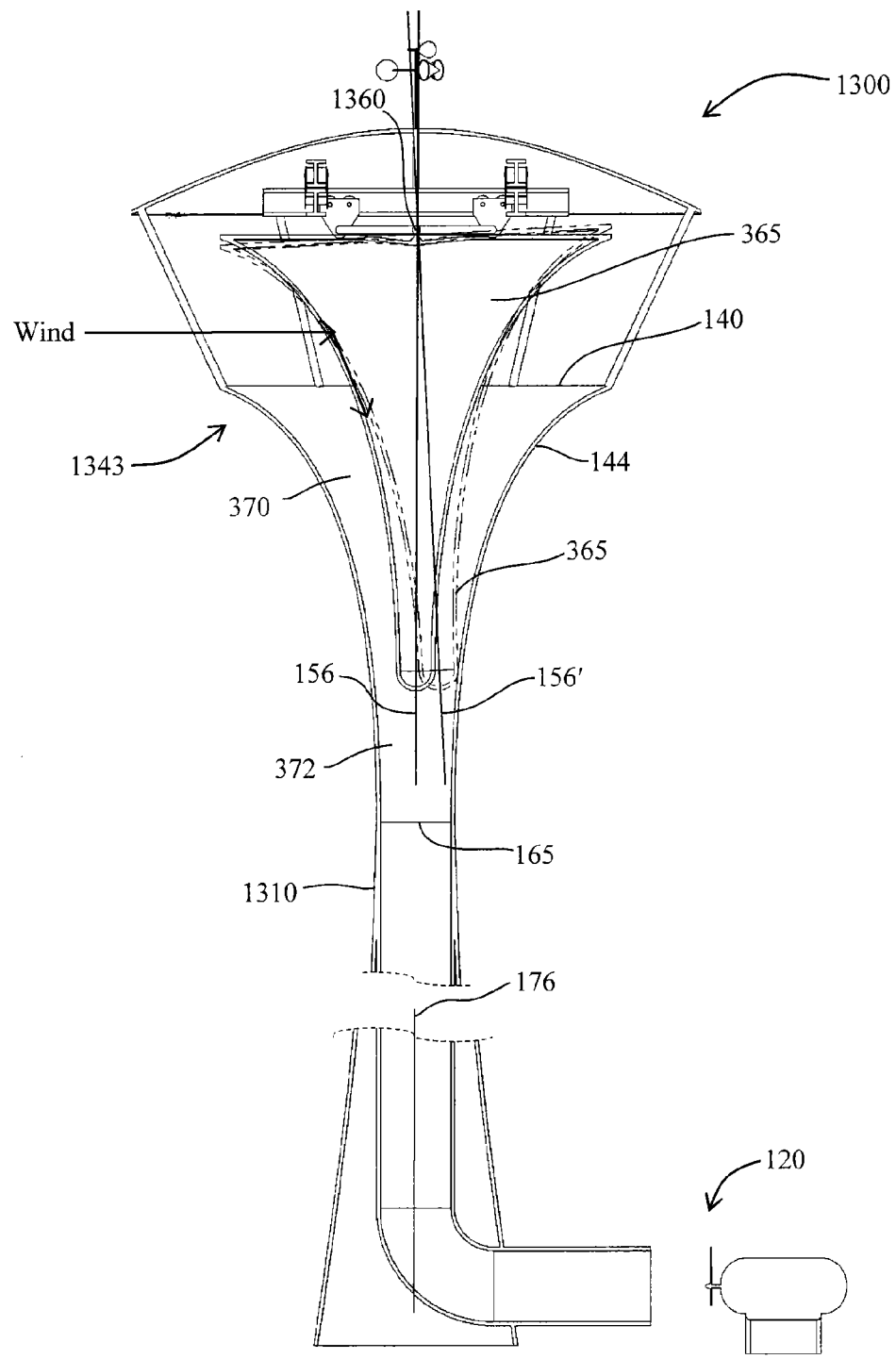
FIG. 15 is a cross-sectional view illustrating an object moving by pivoting within a wind-energy conversion system, according to another embodiment.

FIG. 15 is a cross-sectional view (cross-hatching omitted for clarity) showing deflector 365 moving in rotation, such as pivoting, about substantially a point, such as ball 1360, in response to the wind flowing against deflector 365. For example, the central longitudinal axis 156' of deflector 365 may be rotated (e.g. pivoted) from the central longitudinal axis 156 of nozzle 144 as a result of the rotation, and is thus no longer coincident (e.g., collinear) with the central longitudinal axis 156 of nozzle 144. The rotation causes a portion of the flow passage 370 to be larger on the side of intake assembly 1343 facing the wind, allowing more of the wind to flow into that portion of flow passage 370 than would otherwise occur if deflector 365 was not able to move in response to the wind.

The wind is deflected by deflector 365 into flow passage 370 and subsequently flows through flow passage 370 and into duct 170, as described above in conjunction with FIG. 3. After the wind is received by duct 170, the wind may proceed to turbine 120 as described above in conjunction with FIG. 1.

Note that deflector 365 may be configured to move by translation and/or rotation. For embodiments where deflector 365 is configured to move in both translation and rotation, the movement of deflector 365 in response to the wind flowing against deflector 365 may be a combination of the translation in FIG. 14 and the rotation (e.g., pivoting) in FIG. 15. For example, the rotation and translation may occur substantially concurrently (e.g., concurrently).

Configuring deflector 365 to move by translation and/or rotation in response to receiving the wind at (e.g., against) deflector 365 may be thought of configuring intake assembly 1343 to adjust the size and/or shape of flow passage 370 based on (e.g., in response to) the direction of the wind.

Figure 16:
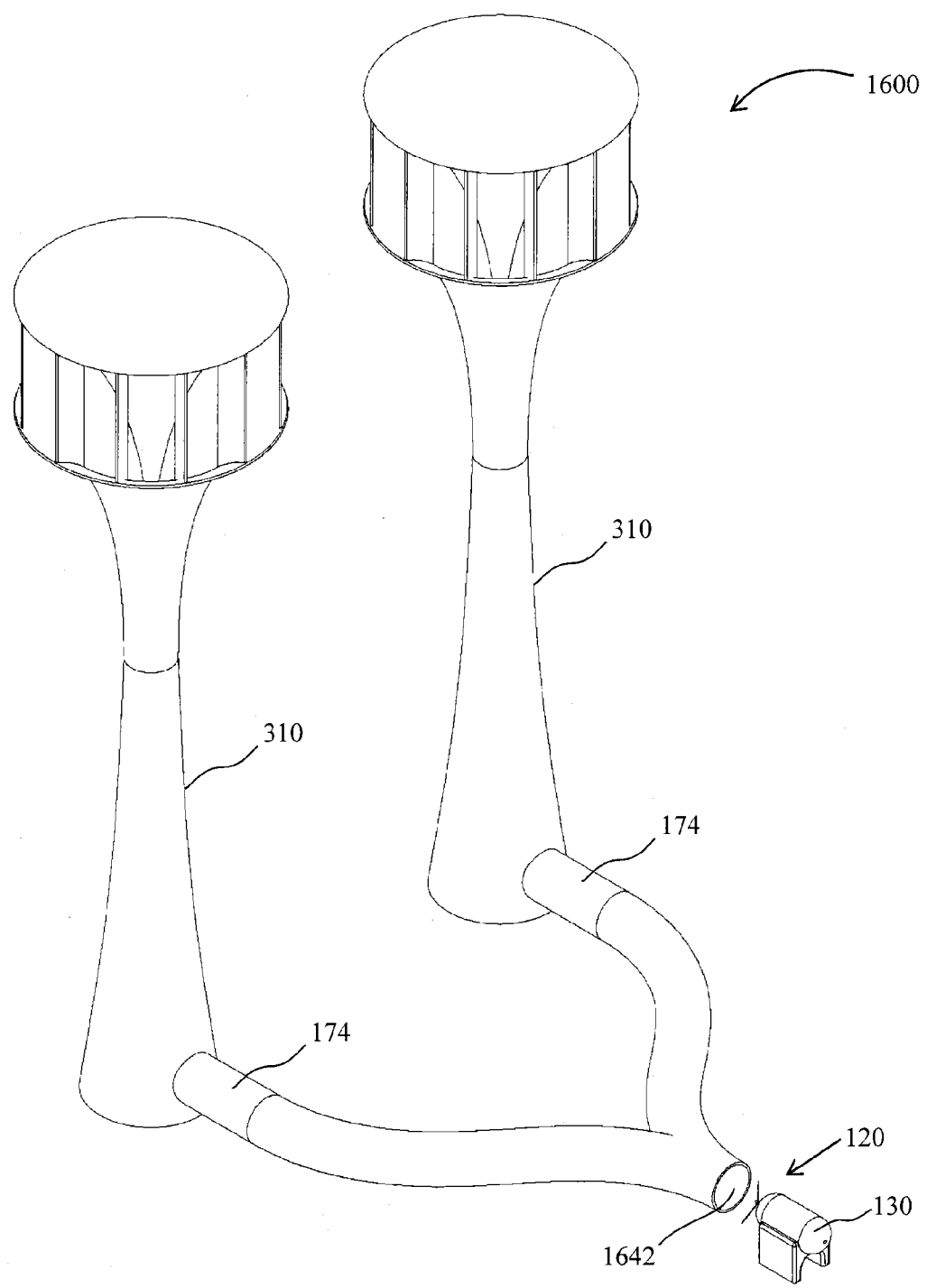
FIG. 16 illustrates the outlets of a plurality of the turbine-intake towers of an embodiment of a wind-energy conversion system coupled together.

For some embodiments, the outlets of two or more of any of the turbine-intake towers disclosed herein may be coupled together and may be sent to a single turbine 120 coupled to a single generator 130, e.g., as shown in FIG. 16 for a wind energy conversion system 1600, e.g., including two turbine-intake towers 310. For example, the outlet ducts 174 of turbine-intake towers 310 may be coupled to a single outlet 1642 directed at turbine 120. For some embodiments, the outlets of at least two of the turbine-intake towers 110, 210, 310, 510, 710, 910, 1110, and 1310 may be coupled together.

Although the examples shown in the figures illustrate nozzles, such as nozzles 144 and 544, and ducts, such as duct 170, as having flow passages with circular cross-sections, the nozzles and ducts disclosed herein may have flow passages with substantially any cross-sectional shape, such as polygonal, e.g., square, rectangular, or any other polygon, elliptical, oval, etc. Moreover, the deflector 365 may have substantially any cross-sectional shape, such as polygonal, e.g., square, rectangular, or any other polygon, elliptical, oval, circular, etc.

For some embodiments, a method of delivering wind to a turbine includes accelerating the wind in a flow passage between a substantially vertical converging nozzle and an object that extends into the nozzle, and directing the accelerated wind onto blades of the turbine.

In the method, accelerating the wind in the flow passage may include turning the wind toward a vertical downward direction as the wind accelerates. The method may include adjusting a size and/or shape of the flow passage based on a wind speed and/or a wind direction.

In the method, accelerating the wind in the flow passage between the vertical converging nozzle and the object may include moving the object in response to receiving the wind against the object, where moving the object changes the size and/or shape of the flow passage.

The method may include, after accelerating the wind in the flow passage and before directing the accelerated wind onto the blades of the turbine, further accelerating the wind in a portion of the nozzle that extends substantially vertically below the object.

The substantially vertical converging nozzle may be a substantially vertical converging first nozzle and the object may be a substantially vertical converging second nozzle. The method may include accelerating the wind through the second nozzle while accelerating the wind in the flow passage between the first nozzle and the second nozzle.

The method may include, before directing the accelerated wind onto the blades of the turbine: merging the accelerated wind from the flow passage between the first nozzle and the second nozzle with the accelerated wind from the second nozzle in a portion of the first nozzle that extends substantially vertically below the second nozzle to produce a substantially single wind-flow in the portion of the first nozzle that extends substantially vertically below the second nozzle, and accelerating the substantially single wind-flow thus produced in the portion of the first nozzle that extends substantially vertically below the second nozzle.

The method may include adjusting a size and/or shape of the flow passage between the first nozzle and the second nozzle and/or a size and/or shape of the second nozzle based on a wind speed.

In the method, accelerating the wind in the flow passage between the first nozzle and the second nozzle may include accelerating the wind in each of a plurality of converging flow passages defined by a plurality of vanes within the flow passage between the first nozzle and the second nozzle and/or accelerating the wind through the second nozzle comprises accelerating the wind in each of a plurality of converging flow passages defined by a plurality of vanes within the second nozzle.

CONCLUSION

Although specific embodiments have been illustrated and described herein it is manifestly intended that the scope of the claimed subject matter be limited only by the following claims and equivalents thereof.

What is claimed is:

1. A wind-energy conversion system, comprising: an intake assembly, comprising:
   a substantially vertical converging nozzle;
   an object extending into the nozzle; and
   a converging flow passage between the object and the nozzle, the wind-energy conversion system further comprising: a substantially vertical support column having a base; and
   a duct located adjacent to a base of the support column; and
   a turbine fluidly coupled to the intake assembly by the duct, wherein the intake assembly is located at a top of a substantially vertical support column.

2. The wind-energy conversion system of claim 1, further comprising an inlet in fluid communication with the vertical converging nozzle, wherein the intake assembly is configured to allow wind to enter the inlet from substantially any direction.

3. A wind-energy conversion system, comprising: an intake assembly located at a top of the wind-energy conversion system, the intake assembly comprising:
   a substantially vertical first converging nozzle;
   a substantially vertical second converging nozzle substantially coaxial with the first nozzle, the wind flow being substantially vertical at an outlet of the intake assembly; and
   a first scoop movably coupled to the first nozzle and/or a second scoop between and movably coupled to the first and second nozzles
   wherein an inlet of the first nozzle is at a vertical level above an inlet of the second nozzle.

4. The wind-energy conversion system of claim 3, further comprising a converging flow passage between the first nozzle and the second nozzle.

5. A wind-energy conversion system, comprising: an intake assembly located at a top of the wind-energy conversion system, the intake assembly comprising:
   a substantially vertical first converging nozzle;
   a substantially vertical second converging nozzle substantially coaxial with the first nozzle, the wind flow being substantially vertical at an outlet of the intake assembly; and
a plurality of vanes extending into an interior of at least one of the first nozzle and the second nozzle, wherein a converging flow passage is between each of adjacent vanes of the plurality of vanes extending into the at least one of the first nozzle and the second nozzle;
   wherein an inlet of the first nozzle is at a vertical level above an inlet of the second nozzle.

6. The wind-energy conversion system of claim 5, further comprising:
   one or more actuators coupled to at least one of the first nozzle, the second nozzle, and the plurality of vanes extending into the at least one of the first nozzle and the second nozzle; and
   a controller electrically coupled to the one or more actuators coupled to the at least one of the first nozzle, the second nozzle, and the plurality of vanes extending into the at least one of the first nozzle and the second nozzle;
   wherein the controller is configured to send signals to the one or more actuators coupled to the at least one of the first nozzle, the second nozzle, and the plurality of vanes extending into the at least one of the first nozzle and the second nozzle based on a wind speed.

7. An intake assembly for a wind-energy conversion system, comprising:
   a substantially vertical converging nozzle having an outlet;
   an object extending into the nozzle;
   a converging flow passage between the object and the nozzle, the wind flow being substantially vertical downward at the outlet of the converging nozzle;
   wherein the flow passage is a first flow passage, and further comprising:
   a plurality of vanes between the object and the nozzle; and
   a plurality of second flow passages, wherein each second flow passage is between adjacent vanes;
   wherein the plurality of second flow passages open into the first flow passage.

8. The intake assembly of claim 7, further comprising an inlet in fluid communication with the vertical converging nozzle, wherein the intake assembly is configured to allow wind to enter the inlet from substantially any direction.

9. The intake assembly of claim 7, wherein the substantially vertical converging nozzle is a substantially vertical converging first nozzle and the object is a substantially vertical converging second nozzle.

10. The intake assembly of claim 7, wherein the object is configured to move within the intake assembly.

11. An intake assembly for a wind-energy conversion system, comprising:
- a substantially vertical converging nozzle having an outlet;
- an object extending into the nozzle;
- a converging flow passage between the object and the nozzle, the wind flow being substantially vertical downward at the outlet of the converging nozzle;
- one or more actuators coupled to at least one of the object and the nozzle; and
- a controller coupled to the one or more actuators coupled to the at least one of the object and the nozzle;
- wherein the controller is configured to send signals to the one or more actuators coupled to the at least one of the object and the nozzle based on a wind speed.

12. The intake assembly of claim 11, wherein the object is configured to move within the intake assembly.

13. An intake assembly for a wind-energy conversion system, comprising:
- a substantially vertical converging nozzle having an outlet;
- an object extending into the nozzle;
- a converging flow passage between the object and the nozzle, the wind flow being substantially vertical downward at the outlet of the converging nozzle; and
- an enclosure that covers an inlet to the flow passage, the enclosure having a plurality of shutters extending between the object and the nozzle, wherein each shutter is configured to open in response to receiving wind against that shutter.

14. The intake assembly of claim 13, wherein the object is configured to move within the intake assembly.

15. A method of delivering wind to a turbine, comprising:
- accelerating the wind in a flow passage between a substantially vertical converging nozzle and an object that extends into the nozzle;
- directing the accelerated wind onto blades of the turbine, the accelerated wind flow being substantially vertical at an outlet of the converging nozzle; and
- activating a plurality of actuators coupled to at least one of the converging nozzle and the object to adjust a size and/or shape of the flow passage based on a wind speed and/or a wind direction.

16. The method of claim 15, wherein accelerating the wind in the flow passage further comprises turning the wind toward a vertical downward direction as the wind accelerates.

17. The method of claim 15, further comprising after accelerating the wind in the flow passage and before directing the accelerated wind onto the blades of the turbine, further accelerating the wind in a portion of the nozzle that extends substantially vertically below the object.

18. The method of claim 15, wherein the substantially vertical converging nozzle is a substantially vertical converging first nozzle and the object is a substantially vertical converging second nozzle, and further comprising accelerating the wind through the second nozzle while accelerating the wind in the flow passage between the first nozzle and the second nozzle.

19. The method of claim 18, further comprising, before directing the accelerated wind onto the blades of the turbine:
- merging the accelerated wind from the flow passage between the first nozzle and the second nozzle with the accelerated wind from the second nozzle in a portion of the first nozzle that extends substantially vertically below the second nozzle to produce a substantially single wind-flow in the portion of the first nozzle that extends substantially vertically below the second nozzle; and
- accelerating the substantially single wind-flow thus produced in the portion of the first nozzle that extends substantially vertically below the second nozzle.

20. The method of claim 18, wherein accelerating the wind in the flow passage between the first nozzle and the second nozzle comprises accelerating the wind in each of a plurality of converging flow passages defined by a plurality of vanes within the flow passage between the first nozzle and the second nozzle and/or wherein accelerating the wind through the second nozzle comprises accelerating the wind in each of a plurality of converging flow passages defined by a plurality of vanes within the second nozzle.

21. A method of delivering wind to a turbine, comprising:
- accelerating the wind in a flow passage between a substantially vertical converging nozzle and an object that extends into the nozzle;
- directing the accelerated wind onto blades of the turbine, the accelerated wind flow being substantially vertical at an outlet of the converging nozzle; and
- wherein accelerating the wind in the flow passage between the vertical converging nozzle and the object comprises moving the object in response to receiving the wind against the object, wherein moving the object changes the size and/or shape of the flow passage.

* * * * *